(12) United States Patent
Kim et al.

(10) Patent No.: US 9,021,393 B2
(45) Date of Patent: Apr. 28, 2015

(54) MOBILE TERMINAL FOR BOOKMARKING ICONS AND A METHOD OF BOOKMARKING ICONS OF A MOBILE TERMINAL

(75) Inventors: Minjoo Kim, Seoul (KR); Isu Byun, Seoul (KR); Jiwoon Kim, Seoul (KR); Sanghyuck Lee, Seoul (KR); Inyong Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 394 days.

(21) Appl. No.: 13/047,741

(22) Filed: Mar. 14, 2011

(65) Prior Publication Data

US 2012/0066630 A1 Mar. 15, 2012

(30) Foreign Application Priority Data

Sep. 15, 2010 (KR) .......................... 10-2010-0090519

(51) Int. Cl.
| | | |
|---|---|---|
| *G06F 3/033* | (2013.01) | |
| *G06F 3/048* | (2013.01) | |
| *G06F 3/14* | (2006.01) | |
| *G06F 3/0481* | (2013.01) | |
| *G06F 3/0488* | (2013.01) | |

(52) U.S. Cl.
CPC .......... *G06F 3/0481* (2013.01); *G06F 3/04817* (2013.01); *G06F 3/0488* (2013.01)

(58) Field of Classification Search
USPC .......... 707/E17.114; 715/769, 773, 775, 779, 715/788, 789, 791, 799, 800, 810, 811, 830, 715/835, 838, 840, 863, 864
See application file for complete search history.

(56) References Cited

U.S. PATENT DOCUMENTS

| | | | | |
|---|---|---|---|---|
| 5,404,442 A | * | 4/1995 | Foster et al. .................. | 715/769 |
| 5,657,049 A | * | 8/1997 | Ludolph et al. ............... | 715/856 |
| 6,240,421 B1 | * | 5/2001 | Stolarz ................................. | 1/1 |
| 6,262,724 B1 | * | 7/2001 | Crow et al. .................... | 715/723 |
| 6,958,749 B1 | * | 10/2005 | Matsushita et al. ........... | 345/175 |
| 2002/0075299 A1 | * | 6/2002 | Tobin et al. ................... | 345/744 |
| 2002/0089536 A1 | * | 7/2002 | Dang ............................. | 345/749 |
| 2003/0160815 A1 | * | 8/2003 | Muschetto ..................... | 345/733 |
| 2003/0174172 A1 | * | 9/2003 | Conrad et al. ................. | 345/781 |

(Continued)

FOREIGN PATENT DOCUMENTS

| | | |
|---|---|---|
| CN | 1482545 A | 3/2004 |
| CN | 101308443 A | 11/2008 |
| CN | 101370067 A | 2/2009 |

OTHER PUBLICATIONS

"Infinidock—Lets You Customize the IPHONE Dock, Add More Apps to It [jailbreak apps]," dated Jan. 11, 2010, and retrieved on Apr. 1, 2013 from http://isource.com/2010/01/11/infinidock-lets-you-customize-the-iphone-dock-add-more-icons.*

(Continued)

*Primary Examiner* — Eric J Bycer
(74) *Attorney, Agent, or Firm* — Lee, Hong, Degerman, Kang & Waimey

(57) ABSTRACT

A mobile terminal is presented. The mobile terminal includes a memory unit, a touchscreen configured to display an icon, and a controller configured to control an operation associated with a function corresponding the icon displayed on the touchscreen, control the touchscreen to display a UI (user interface) for bookmarking icons, detect a bookmark command for the icon displayed on the touchscreen, temporarily store, in the memory unit, the icon in response to the bookmark command, and control the touchscreen to display the bookmarked icon within the UI.

25 Claims, 29 Drawing Sheets

(56) References Cited

U.S. PATENT DOCUMENTS

| | | | |
|---|---|---|---|
| 2004/0066411 A1* | 4/2004 | Fung et al. | 345/781 |
| 2004/0155909 A1* | 8/2004 | Wagner | 345/854 |
| 2005/0210145 A1* | 9/2005 | Kim et al. | 709/231 |
| 2006/0085763 A1* | 4/2006 | Leavitt et al. | 715/810 |
| 2006/0112335 A1* | 5/2006 | Hofmeister et al. | 715/701 |
| 2007/0027949 A1* | 2/2007 | Park et al. | 709/203 |
| 2007/0044010 A1* | 2/2007 | Sull et al. | 715/500.1 |
| 2007/0074126 A1* | 3/2007 | Fisher et al. | 715/764 |
| 2007/0156627 A1* | 7/2007 | D'Alicandro | 707/1 |
| 2007/0189719 A1* | 8/2007 | Furumachi et al. | 386/95 |
| 2007/0198944 A1* | 8/2007 | Viswanathan et al. | 715/778 |
| 2007/0198946 A1* | 8/2007 | Viji et al. | 715/779 |
| 2007/0244903 A1* | 10/2007 | Ratliff et al. | 707/10 |
| 2008/0034314 A1* | 2/2008 | Louch et al. | 715/778 |
| 2008/0046840 A1* | 2/2008 | Melton et al. | 715/825 |
| 2008/0077866 A1* | 3/2008 | Margulis | 715/723 |
| 2008/0195961 A1* | 8/2008 | Bae et al. | 715/769 |
| 2008/0201650 A1* | 8/2008 | Lemay et al. | 715/763 |
| 2008/0235602 A1* | 9/2008 | Strauss et al. | 715/762 |
| 2009/0265628 A1* | 10/2009 | Bamford et al. | 715/702 |
| 2009/0319900 A1* | 12/2009 | Namai et al. | 715/717 |
| 2010/0088597 A1* | 4/2010 | Shin et al. | 715/704 |
| 2010/0114857 A1* | 5/2010 | Edwards et al. | 707/709 |
| 2010/0122194 A1* | 5/2010 | Rogers | 715/769 |
| 2010/0138782 A1* | 6/2010 | Rainisto | 715/808 |
| 2010/0169906 A1* | 7/2010 | Takahashi | 725/13 |
| 2011/0225539 A1* | 9/2011 | Lee et al. | 715/784 |
| 2011/0289427 A1* | 11/2011 | Toprani | 715/746 |

OTHER PUBLICATIONS

The State Intellectual Property Office of the People's Republic of China Application Serial No. 201110070763.X, Office Action dated Aug. 7, 2013, 15 pages.

* cited by examiner

FIG. 9
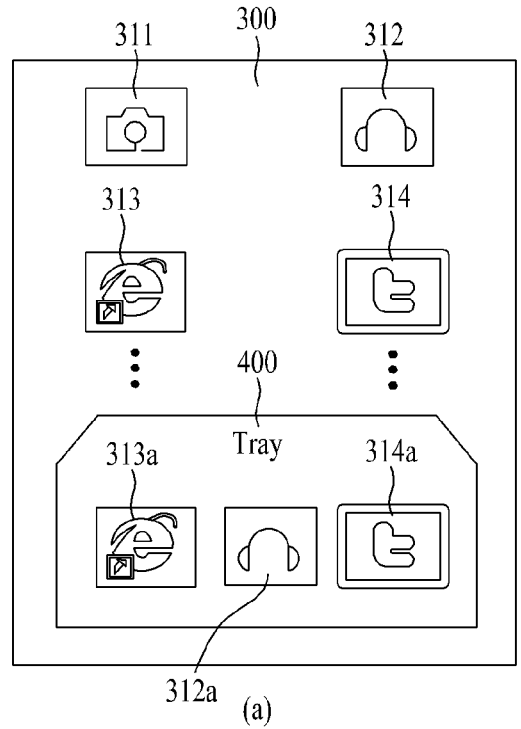
(a)
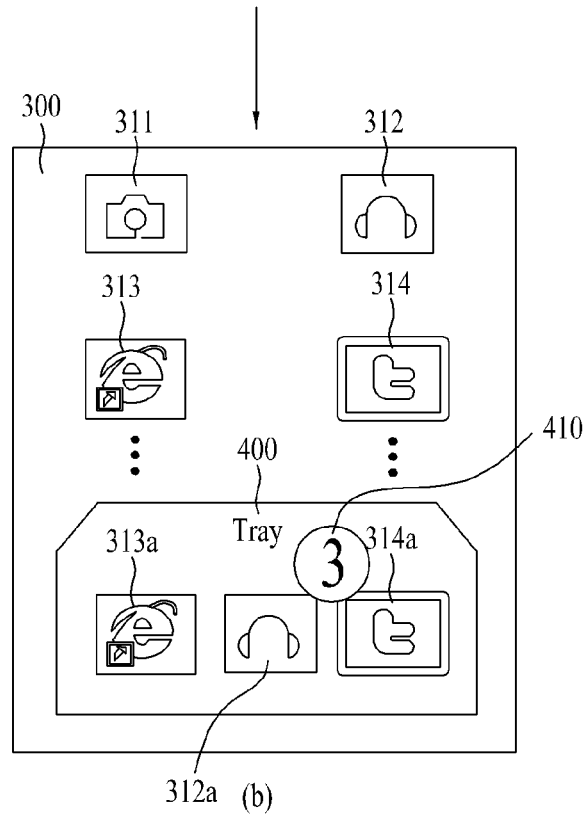
(b)

FIG. 10
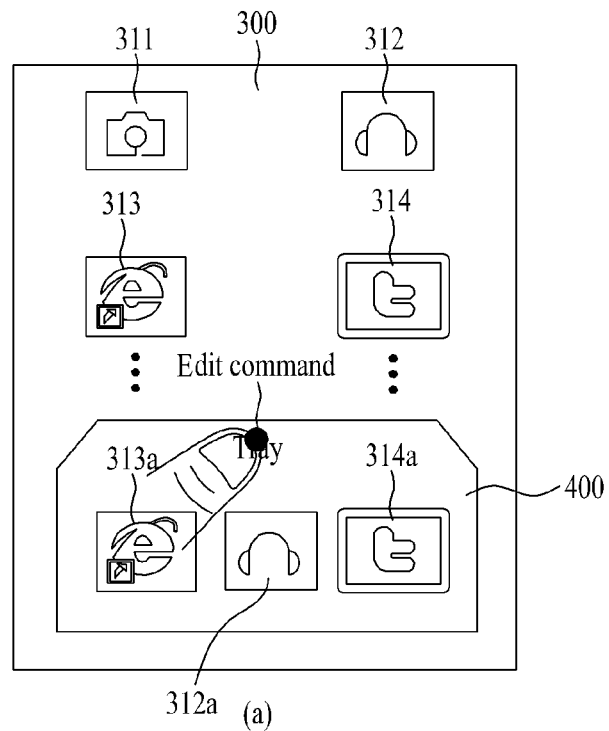
(a)
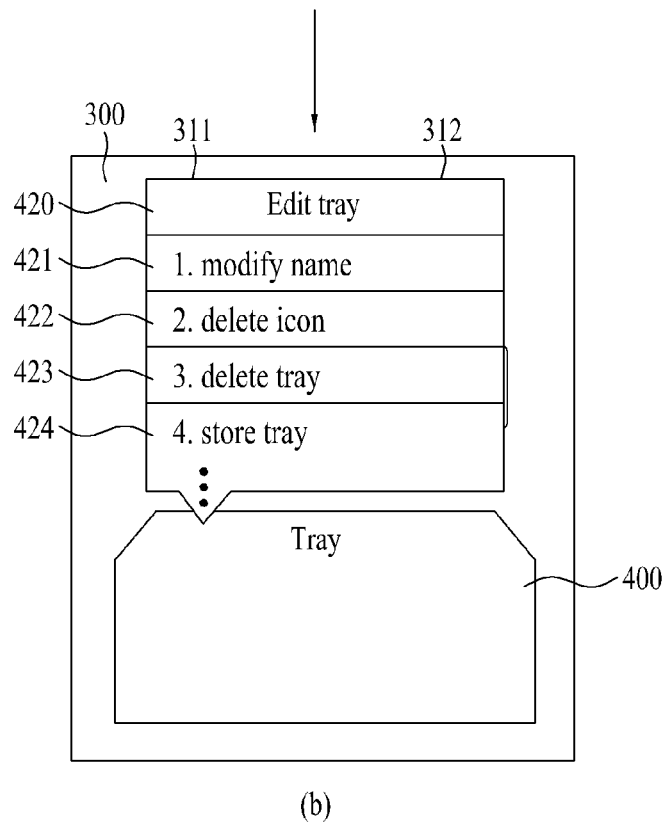
(b)

FIG. 11
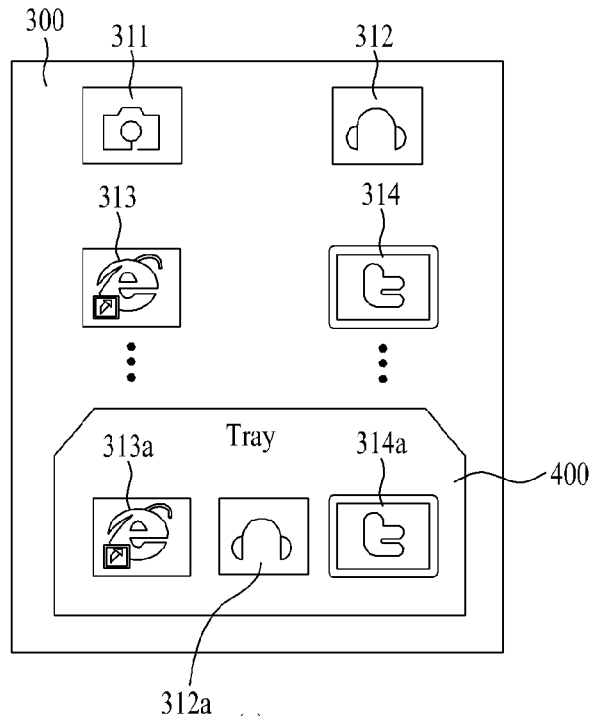
(a)
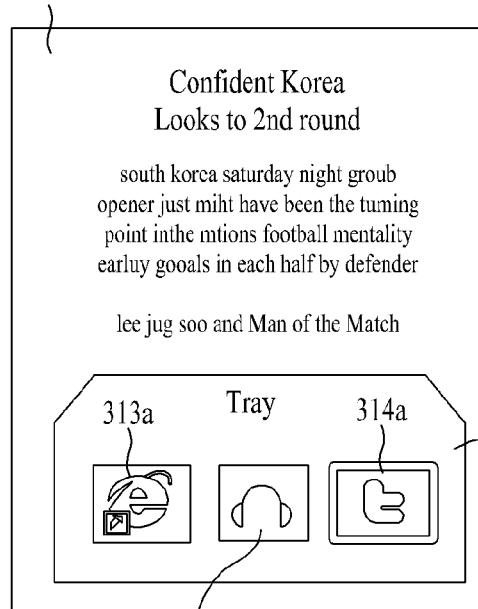
(b)

FIG. 14
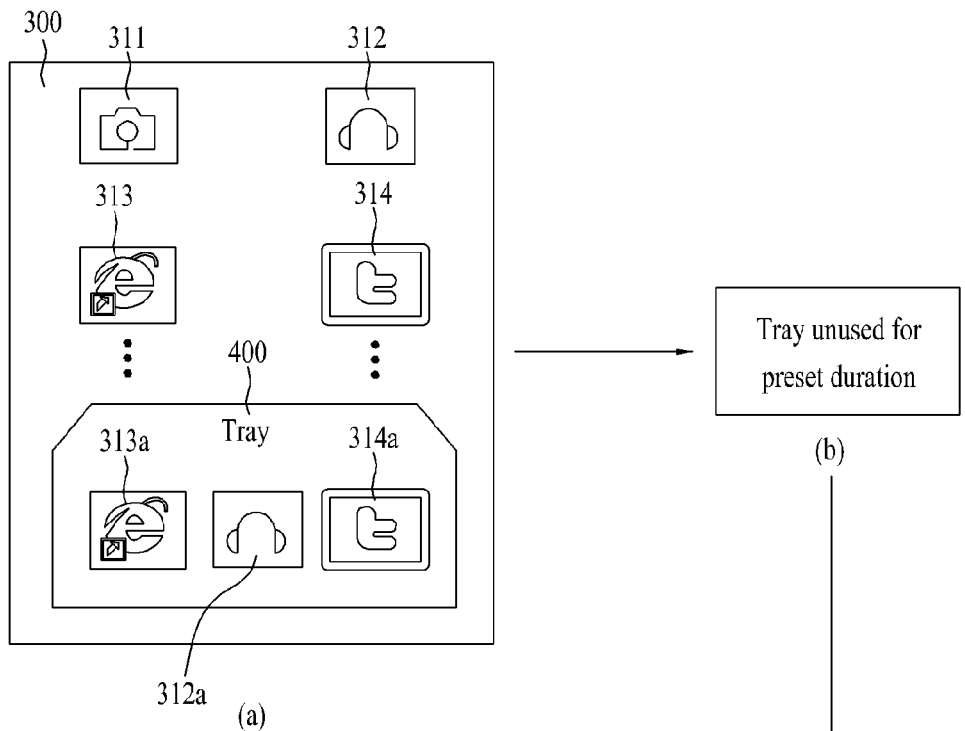
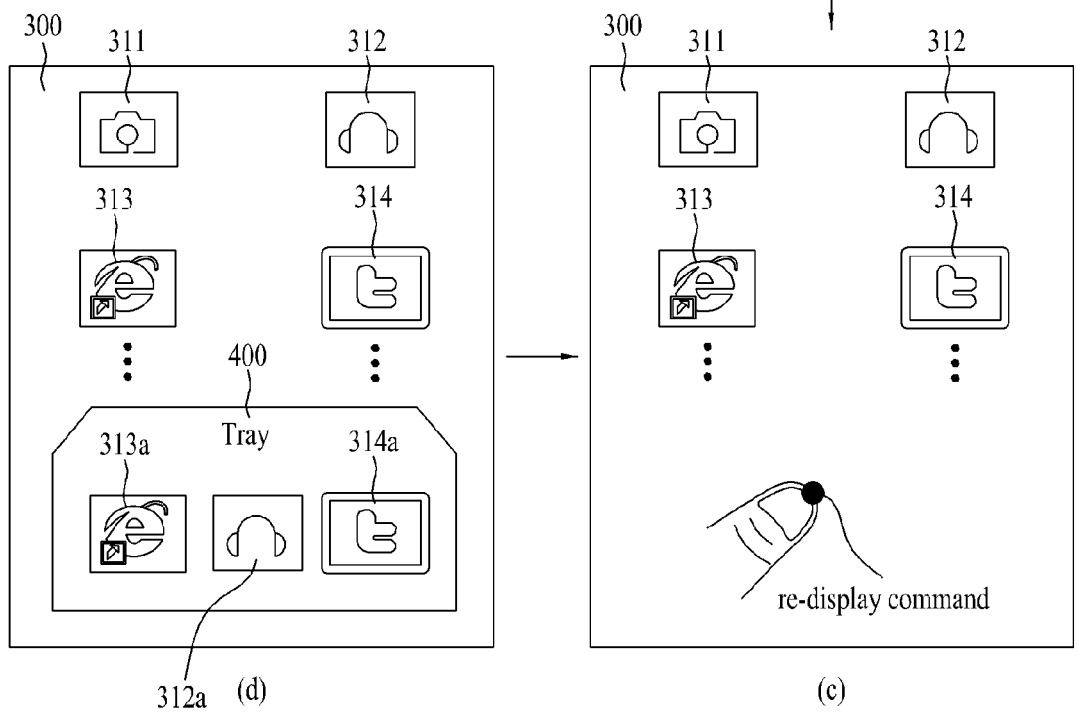

FIG. 15
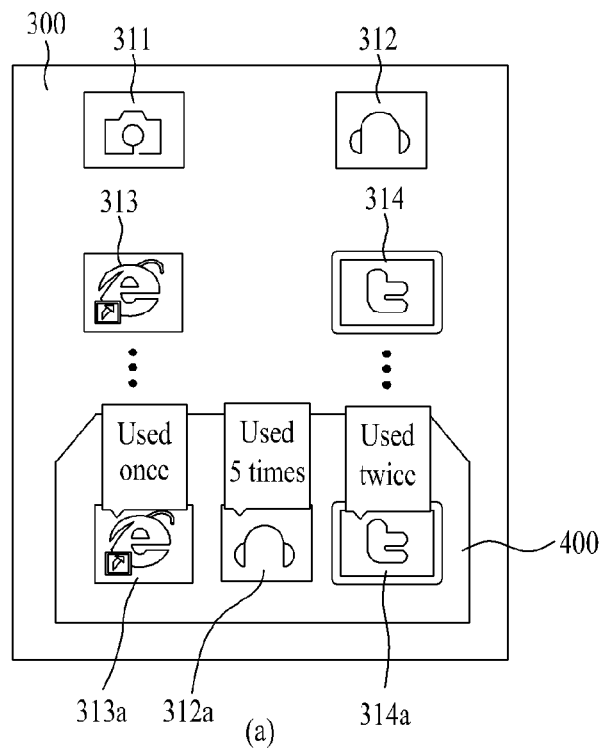
(a)
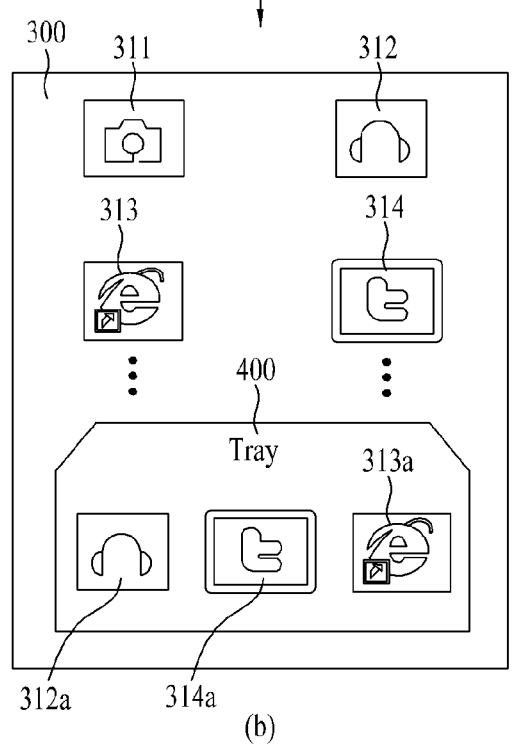
(b)

FIG. 16
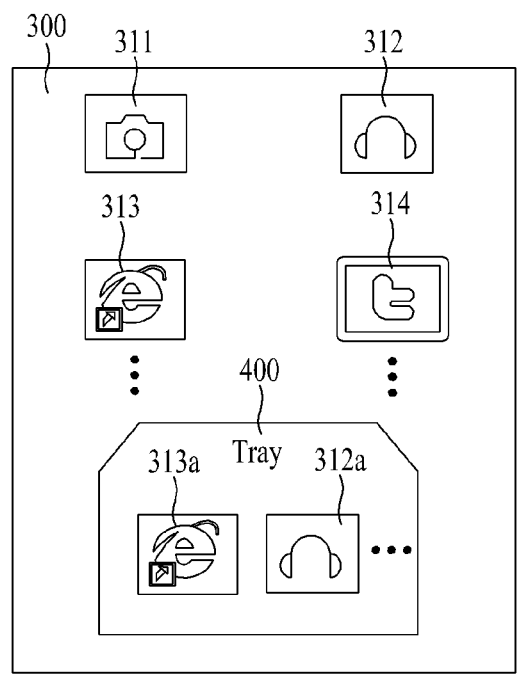
(a)
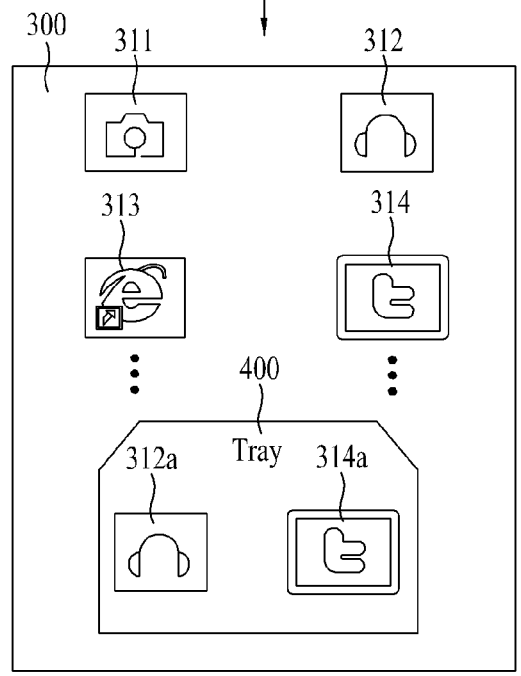
(b)

FIG. 20
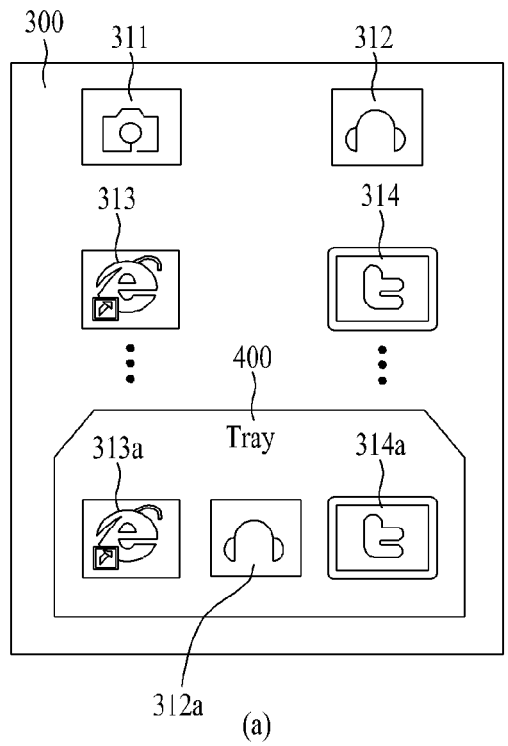
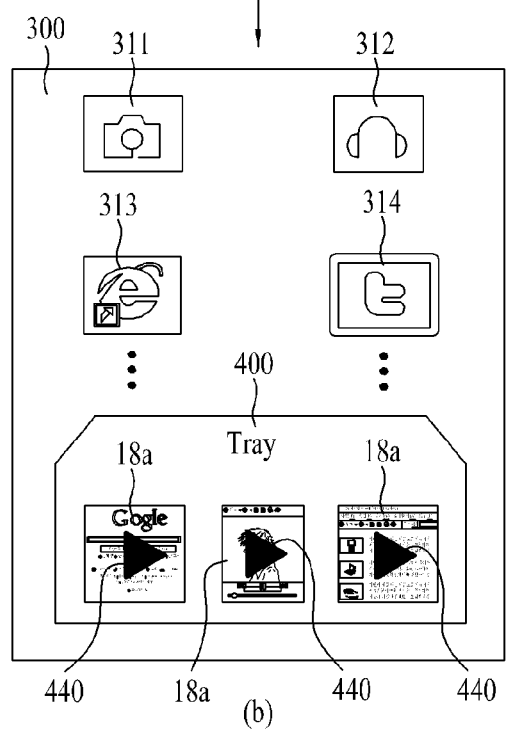

FIG. 23
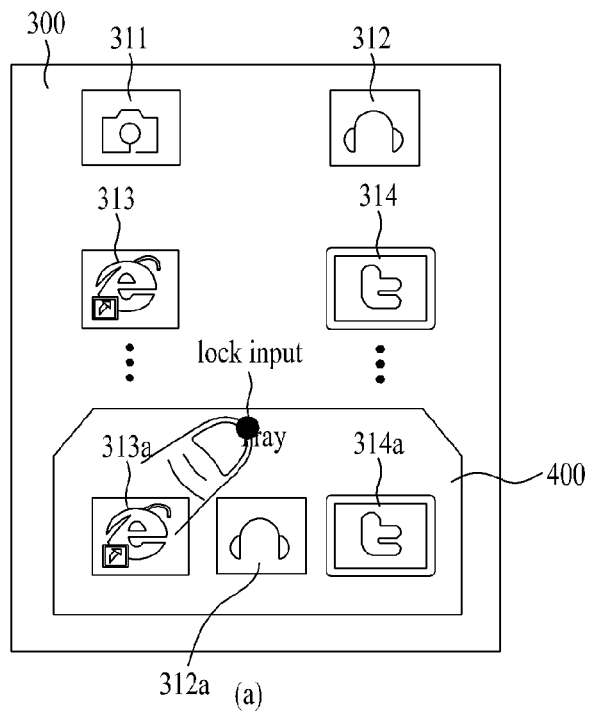
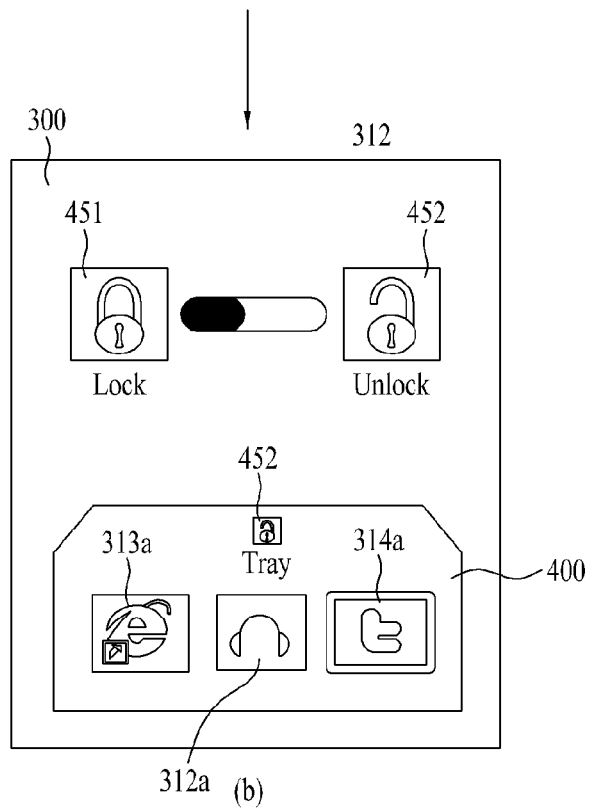

FIG. 27
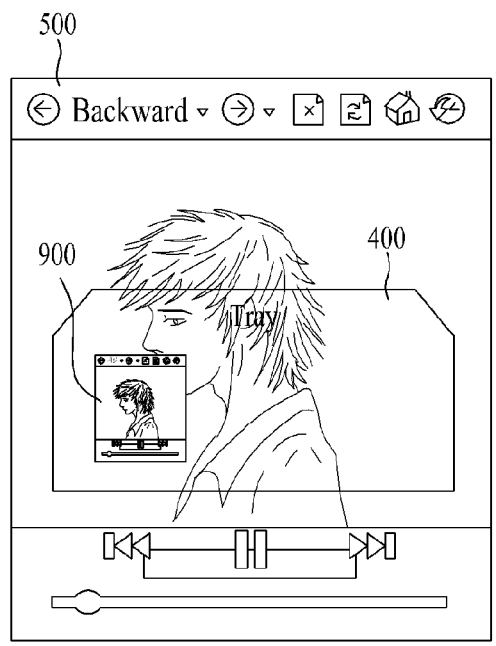
(a)
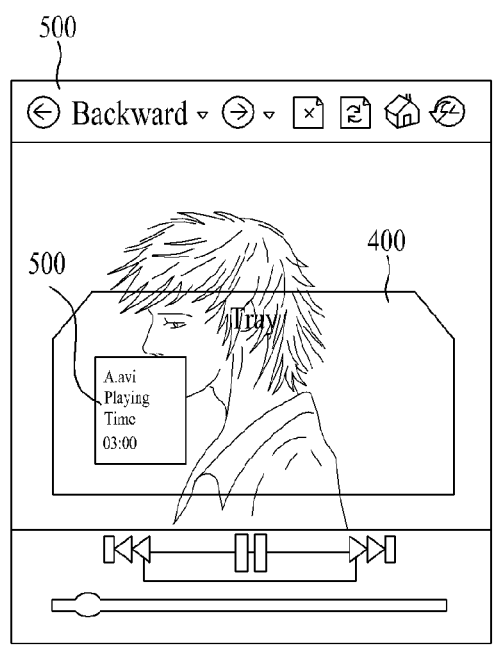
(b)

FIG. 28
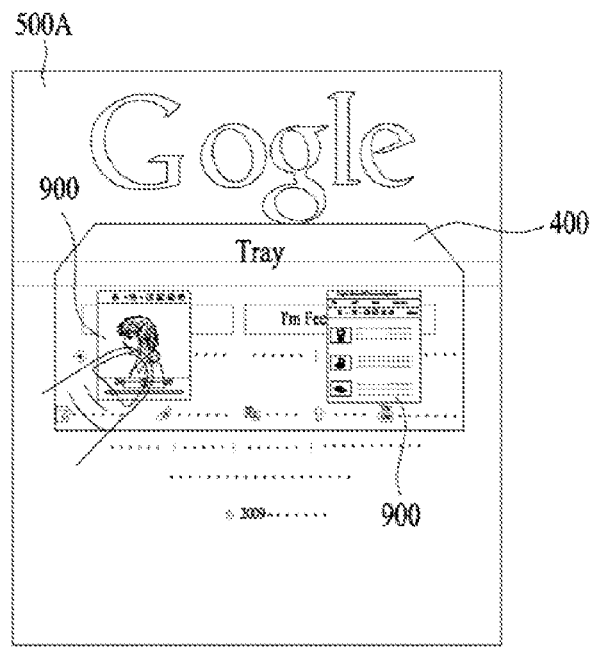
(a)
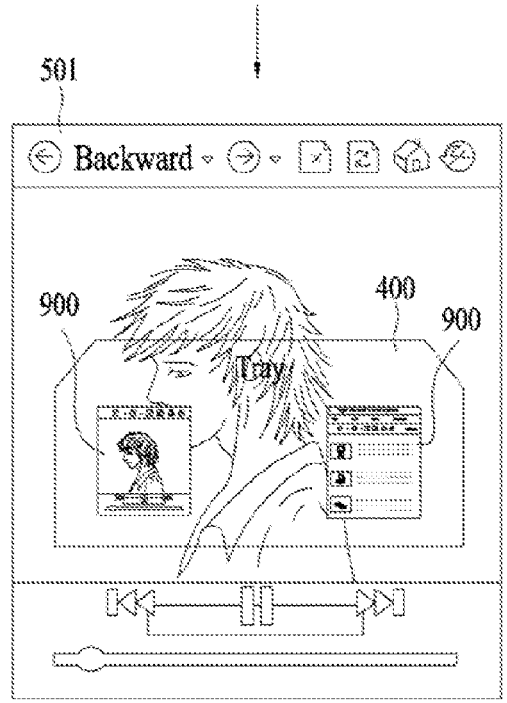
(b)

FIG. 29
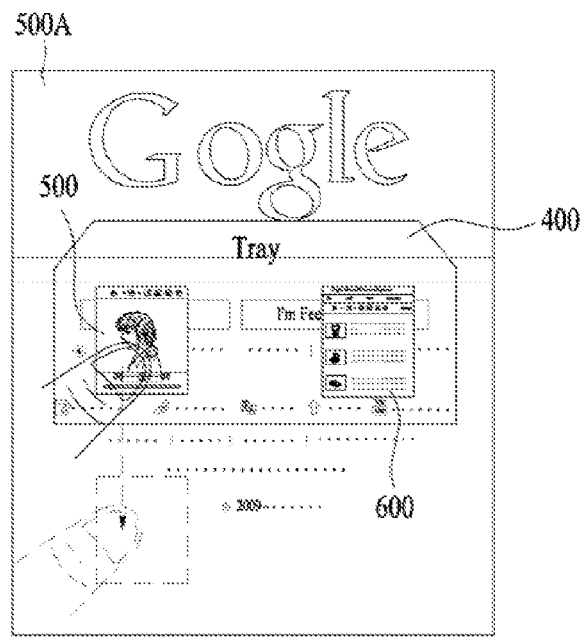
(a)
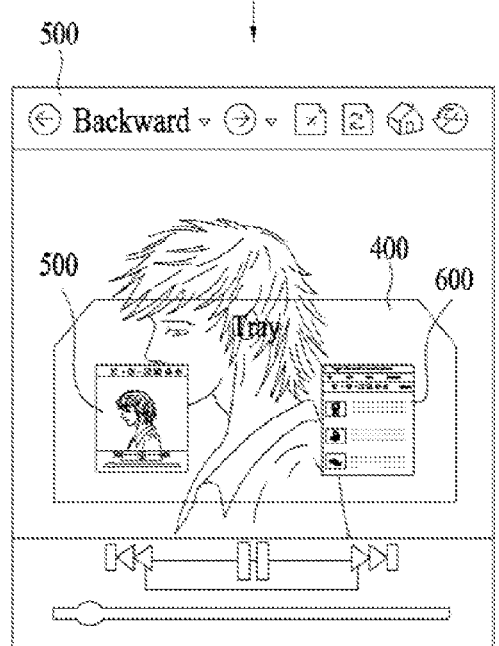
(b)

MOBILE TERMINAL FOR BOOKMARKING ICONS AND A METHOD OF BOOKMARKING ICONS OF A MOBILE TERMINAL

CROSS-REFERENCE TO RELATED APPLICATIONS

Pursuant to 35 U.S.C. §119(a), this application claims the benefit of the earlier filing date and right of priority to Korean Application No. 10-2010-0090519, filed on Sep. 15, 2010, the contents of which are hereby incorporated by reference herein in their entirety.

BACKGROUND OF THE INVENTION

1. Field of the Invention

The present invention relates to a mobile terminal, and more specifically, to a mobile terminal and controlling method thereof.

2. Discussion of the Related Art

A mobile terminal is a device which may be configured to perform various functions. Examples of such functions include data and voice communications, capturing images and video via a camera, recording audio, outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. Additionally, the mobile terminals can be further classified into handheld terminals and vehicle mount terminals according to their portability.

In most circumstances, when a terminal is implemented as a multimedia device, a size of an internal or external memory of the terminal is increased to allow for more storage of content.

However, as more content is stored in the terminal, it is inconvenient for a user to perform numerous key inputs to search through a content list for a specific content item. Accordingly, it is often useful to provide a more convenient search function for content stored in a terminal.

SUMMARY

According to one embodiment, a mobile terminal is presented. The mobile terminal includes a memory unit, a wireless communication unit, a touchscreen configured to display a webpage including at least one hyperlink, and a controller configured to store a hyperlink selected on the touchscreen in the memory unit, display information associated with the selected hyperlink on the touchscreen, and display, on the touchscreen, a webpage linked to the selected hyperlink when the displayed information is selected.

According to one embodiment a mobile terminal is presented. The mobile terminal includes a memory unit, a touchscreen configured to display an icon, and a controller configured to control an operation associated with a function corresponding the icon displayed on the touchscreen, control the touchscreen to display a UI (user interface) for bookmarking icons, detect a bookmark command for the icon displayed on the touchscreen, temporarily store, in the memory unit, the icon in response to the bookmark command, and control the touchscreen to display the bookmarked icon within the UI.

According to one feature, the bookmark command is initialized when the icon is dragged into the UI.

According to another feature, the bookmark command is initialized when the icon and the UI are simultaneously touched.

According to yet another feature, a size or a position of the UI is editable. Furthermore, the UI and the bookmarked icon are stored in the memory unit. Additionally, the UI is constantly displayed.

According to still yet another feature, the controller controls the UI to be displayed on a side of the touchscreen in a reduced state and the UI is fully displayed when the reduced state UI is selected.

According to one feature, the controller controls the UI to be effectively hidden on the screen when the UI is not used during a preset period of time and wherein the controller controls the hidden UI to be re-displayed on the screen when a command for displaying the hidden UI is input.

According to yet another feature, the controller displays information indicating the number of the icons bookmarked in the UI.

According to still yet another feature, the controller displays the icons in the UI by sequentially scrolling the icons when at least two icons are bookmarked into the UI.

According to one feature, the controller executes the function assigned to a selected icon when the icon bookmarked in the UI is selected.

According to yet another feature, the controller executes the function assigned to the icon when the icon bookmarked in the UI is shifted outside the UI. Additionally, the controller controls an execution screen of the currently executed function to be displayed as a thumbnail in the UI. Furthermore, when the thumbnail is selected, the controller switches a current screen to an execution screen of a function corresponding to the selected thumbnail.

According to still yet another feature, the controller partitions a screen of the touchscreen into a first region for displaying the icon and a second region for displaying the UI.

According to another embodiment method of controlling a mobile terminal is presented. The method includes displaying an icon on a touchscreen, displaying a UI (user interface) for bookmarking the icon, temporarily storing the icon in response to a command for bookmarking the icon, and displaying the temporarily stored icon within the UI.

According to yet another embodiment, a mobile terminal is presented. The mobile terminal includes a memory unit, a touchscreen configured to display content on a screen, and a controller configured to control an operation associated with the content, the controller configured to control the touchscreen to display a UI (user interface) for bookmarking the content displayed on the screen, temporarily store, in the memory unit, an image of the content corresponding to a timing point of receiving a bookmark command when the bookmark command is input, and control the touchscreen to display the temporarily stored image of the content within the UI.

According to still yet another embodiment, method of controlling a mobile terminal is presented. The method comprising displaying content on a touchscreen of the mobile terminal, displaying a UI (user interface) for bookmarking the content, temporarily storing, in a memory device, an image of the content corresponding to a timing point in response to receiving a command for bookmarking the content, displaying the temporarily stored image of the content within the UI.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures.

FIG. 9 illustrates a process for informing a user of the number of icons bookmarked in a tray UI according to an embodiment of the present invention.

FIG. 10 illustrates a process for editing a tray UI and icons bookmarked within the tray UI according to an embodiment of the present invention.

FIG. 11 and FIG. 12 illustrate a process for displaying a tray UI on a screen according to an embodiment of the present invention.

FIG. 14 illustrates a process for displaying a tray UI on a screen according to an embodiment of the present invention.

FIG. 15 illustrates a process for displaying icons bookmarked in a tray UI according to an embodiment of the present invention.

FIG. 16 illustrates a process for scrolling and displaying icons bookmarked in a tray UI according to an embodiment of the present invention.

FIG. 20 and FIG. 21 illustrate a process for executing functions of icons bookmarked in a tray UI according to an embodiment of the present invention.

FIG. 23 illustrates a process for locking a screen according to an embodiment of the present invention.

FIG. 27 illustrates a process for displaying a content screen bookmarked in a tray UI according to an embodiment of the present invention.

FIG. 28 and FIG. 29 illustrate a process for re-executing a content screen bookmarked in a tray UI according to an embodiment of the present invention.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes "module," "unit," and "part" are used for elements in order to facilitate the disclosure only. Therefore, significant meanings or roles are not given to the suffixes themselves and it is understood that the "module," "unit," and "part" can be used together or interchangeably.

Mobile terminals described in this disclosure can include a mobile phone, a smart phone, a laptop computer, a digital broadcast terminal, a PDA (personal digital assistant), a PMP (portable multimedia player), and a navigation system.

Except where applicable to a mobile terminal only, it will be appreciated by those skilled in the art that features described herein with reference to one or more embodiments may be applicable to a stationary terminal such as a digital TV, or a desktop computer.

Figure 1:
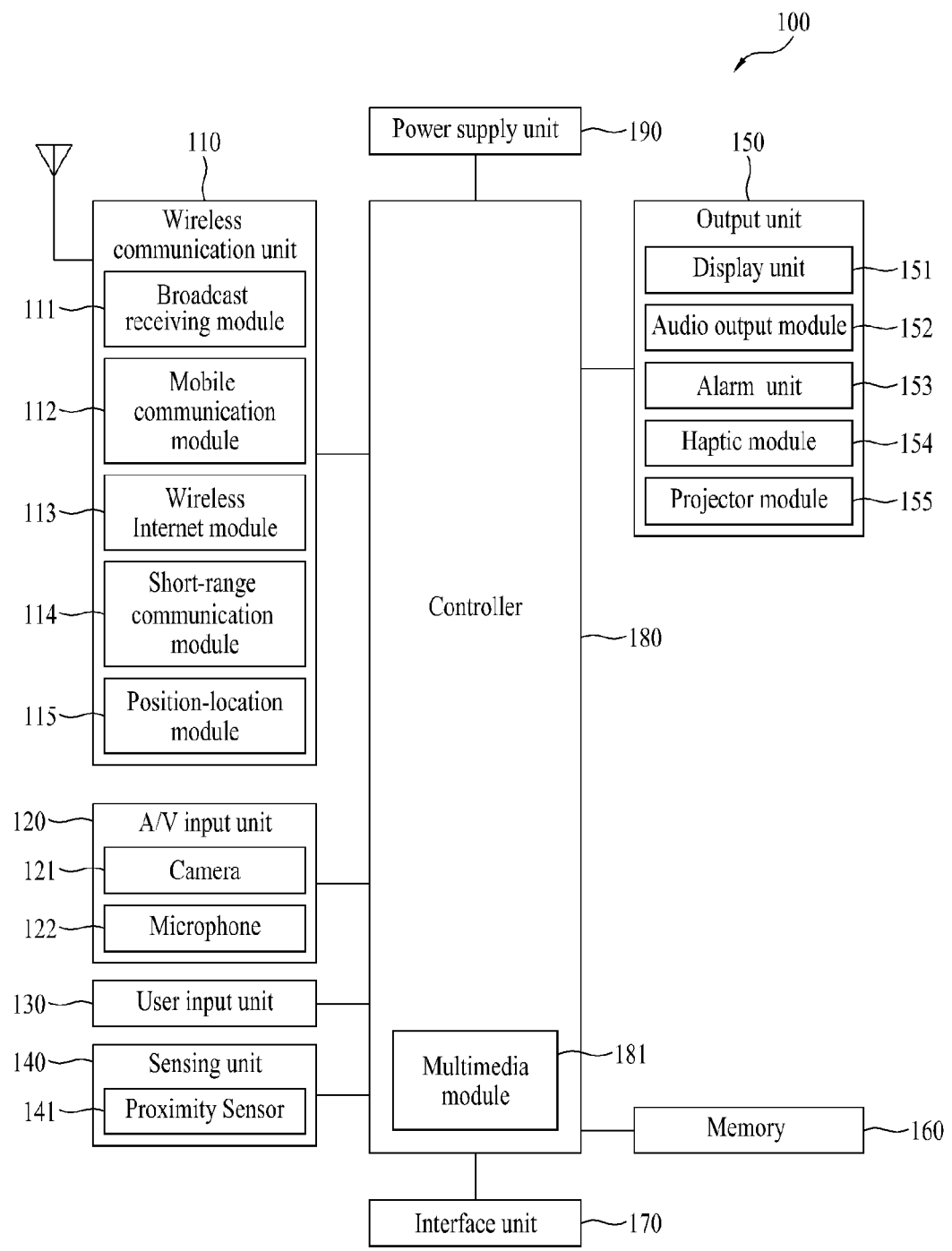
FIG. 1 is a block diagram of a mobile terminal according to one embodiment of the present invention.

FIG. 1 is a block diagram of a mobile terminal 100 according to one embodiment of the present invention. Referring to FIG. 1, the mobile terminal 100 includes a wireless communication unit 110, an A/V (audio/video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. More or fewer components may be implemented according to various embodiments.

The wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and/or a terrestrial channel.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal and/or broadcast associated information received by the broadcast receiving module 111 may be stored in a suitable device, such as a memory 160.

The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of a digital multimedia broadcasting (DMB) system and an electronic service guide (ESG) of a digital video broadcast-handheld (DVB-H).

The broadcast receiving module 111 may be configured to receive broadcast signals transmitted from various types of broadcast systems. By nonlimiting example, such broadcasting systems may include a digital multimedia broadcasting-terrestrial (DMB-T) system, a digital multimedia broadcasting-satellite (DMB-S) system, DVB-H, the data broadcasting system known as media forward link only (MediaFLO™) and an integrated services digital broadcast-terrestrial (ISDB-T) system. Optionally, the broadcast receiving module 111 can be configured to be suitable for other broadcasting systems as well as the above-noted digital broadcasting systems.

The mobile communication module 112 transmits/receives wireless signals to/from one or more network entities (e.g., a base station, an external terminal, and/or a server). Such wireless signals may carry audio, video, and data according to text/multimedia messages.

The wireless Internet module 113 supports Internet access for the mobile terminal 100. This module may be internally or externally coupled to the mobile terminal 100. The wireless Internet technology can include WLAN (Wireless LAN), Wi-Fi, Wibro™ (Wireless broadband), Wimax™ (World Interoperability for Microwave Access), and HSDPA (High Speed Downlink Packet Access).

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 115 identifies or otherwise obtains the location of the mobile terminal 100. According to one embodiment, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes (or produces) image frames of still pictures or video, which are obtained by an image sensor in a video call mode or a photographing mode. Furthermore, the processed image frames can be displayed on the display unit 151.

The image frames processed by the camera 121 can be stored in the memory 160 or can be transmitted to an external recipient via the wireless communication unit 110. Optionally, at least two cameras 121 can be provided in the mobile terminal 100 according to the environment of usage.

The microphone 122 receives an external audio signal while the portable device is in a particular mode, such as phone call mode, recording mode and voice recognition mode. This audio signal is processed and converted into electronic audio data. The processed audio data is transformed into a format transmittable to a mobile communication base station via the mobile communication module 112 in a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, and a jog switch.

The sensing unit 140 provides sensing signals for controlling operations of the mobile terminal 100 using status measurements of various aspects of the mobile terminal. For instance, the sensing unit 140 may detect an open/closed status of the mobile terminal 100, the relative positioning of components (e.g., a display and keypad) of the mobile terminal 100, a change of position (or location) of the mobile terminal 100 or a component of the mobile terminal 100, a presence or absence of user contact with the mobile terminal 100, and an orientation or acceleration/deceleration of the mobile terminal 100.

As an example, a mobile terminal 100 configured as a slide-type mobile terminal is considered. In this configuration, the sensing unit 140 may sense whether a sliding portion of the mobile terminal is open or closed. According to other examples, the sensing unit 140 senses the presence or absence of power provided by the power supply 190, and the presence or absence of a coupling or other connection between the interface unit 170 and an external device. According to one embodiment, the sensing unit 140 can include a proximity sensor 141 and a motion sensor 142.

The motion sensor 142 detects a body motion of the mobile terminal 100. The motion sensor 142 outputs a signal corresponding to the detected body motion to the controller 180.

The output unit 150 generates output relevant to the senses of sight, hearing, and touch. Furthermore, the output unit 150 includes the display unit 151, an audio output module 152, an alarm unit 153, a haptic module 154, and a projector module 155.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays can be implemented as a transparent or optically transmissive type, i.e., a transparent display. A representative example of the transparent display is a TOLED (transparent OLED). A rear configuration of the display unit 151 can be implemented as the optically transmissive type as well. In this configuration, a user may be able to see an object located at the rear of a terminal body on a portion of the display unit 151 of the terminal body.

At least two display units 151 can be provided in the mobile terminal 100 in accordance with one embodiment of the mobile terminal 100. For instance, a plurality of display units can be arranged to be spaced apart from each other or to form a single body on a single face of the mobile terminal 100. Alternatively, a plurality of display units can be arranged on different faces of the mobile terminal 100.

If the display unit 151 and a sensor for detecting a touch action (hereinafter called 'touch sensor') is configured as a mutual layer structure (hereinafter called 'touchscreen'), the display unit 151 is usable as an input device as well as an output device. In this case, the touch sensor can be configured as a touch film, a touch sheet, or a touchpad.

The touch sensor can be configured to convert pressure applied to a specific portion of the display unit 151 or a variation of capacitance generated from a specific portion of the display unit 151 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 180. Therefore, the controller 180 is made aware when a prescribed portion of the display unit 151 is touched.

Referring to FIG. 1, a proximity sensor 141 can be provided at an internal area of the mobile terminal 100 enclosed by the touchscreen or around the touchscreen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 141 is more durable than a contact type sensor and also has utility broader than the contact type sensor.

The proximity sensor 141 can include one of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touchscreen includes the electrostatic capacity proximity sensor, it is configured to detect the proximity of a pointer using a variation of an electric field according to the proximity of the pointer. In this configuration, the touchscreen (touch sensor) can be considered as the proximity sensor 141.

In the following description, for purposes of clarity, an action in which a pointer approaches the touchscreen without contacting the touchscreen will sometimes be referred to as a "proximity touch." Furthermore, an action in which a pointer actually touches the touchscreen will sometimes be referred to as a "contact touch." The position on the touchscreen that is proximity-touched by the pointer refers to the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touchscreen.

The audio output module 152 functions in various modes including a call-receiving mode, a call-placing mode, a recording mode, a voice recognition mode, and a broadcast reception mode to output audio data which is received from the wireless communication unit 110 or is stored in the memory 160. During operation, the audio output module 152 outputs audio relating to a particular function (e.g., call received, message received). The audio output module 152 may be implemented using one or more speakers, buzzers, other audio producing devices, and combinations thereof The alarm unit 153 outputs a signal for announcing the occurrence of a particular event associated with the mobile terminal 100. Typical events include a call received, a message received and a touch input received. The alarm unit 153 is able to output a signal for announcing the event occurrence by way of vibration as well as video or audio signal. The video or audio signal can be output via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. The strength and pattern of the vibration generated by the haptic module 154 are controllable. For instance, different vibrations can be output in a manner of being synthesized together or can be output in sequence.

The haptic module 154 is able to generate various tactile effects in addition to the vibration. For instance, the haptic module 154 may generate an effect attributed to an arrangement of pins vertically moving against a contacted skin surface, an effect attributed to an injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 154 can be implemented to enable a user to sense the tactile effect through a muscle sense of a finger or an arm as well as to transfer the tactile effect through direct contact. Optionally, at least two haptic modules 154 can be provided in the mobile terminal 100 in accordance with one embodiment of the mobile terminal 100.

The projector module 155 is an element for performing an image projector function using the mobile terminal 100. The projector module 155 is able to display an image, which is identical to or at least partially different from the image displayed on the display unit 151, on an external screen or wall according to a control signal of the controller 180.

In particular, the projector module 155 can include a light source generating light (e.g., a laser) for projecting an external image, an image producing means for producing an external image to project using the light generated from the light source, and a lens for enlarging the external image according to a predetermined focal distance. Furthermore, the projector module 155 can further include a device for adjusting an image projection direction by mechanically moving the lens or the whole module.

The projector module 155 can be a CRT (cathode ray tube) module, an LCD (liquid crystal display) module, or a DLP (digital light processing) module according to a device type. In particular, the DLP module is operated by enabling the light generated from the light source to reflect on a DMD (digital micro-mirror device) chip and can be advantageous for reducing the size of the projector module 155.

In many configurations, the projector module 155 can be provided in a lengthwise direction of a lateral, front or backside direction of the mobile terminal 100. Furthermore, it is understood that the projector module 155 can be provided in any portion of the mobile terminal 100 as deemed necessary.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures, and moving pictures. Furthermore, a recent use history or a cumulative use frequency of each data (e.g., use frequency for each phonebook, each message or each multimedia file) can be stored in the memory 160. Moreover, data for various patterns of vibration and/or sound output in response to a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, or XD memory), or other similar memory or data storage device. Furthermore, the mobile terminal 100 is able to operate in association with a web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 100 and can include a User Identity Module (UIM), a Subscriber Identity Module (SIM), and/or a Universal Subscriber Identity Module (USIM). A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 controls the overall operations of the mobile terminal 100. For example, the controller 180 performs the control and processing associated with voice calls, data communications, and video calls. The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

The power supply unit 190 provides power required by various components of the mobile terminal 100. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
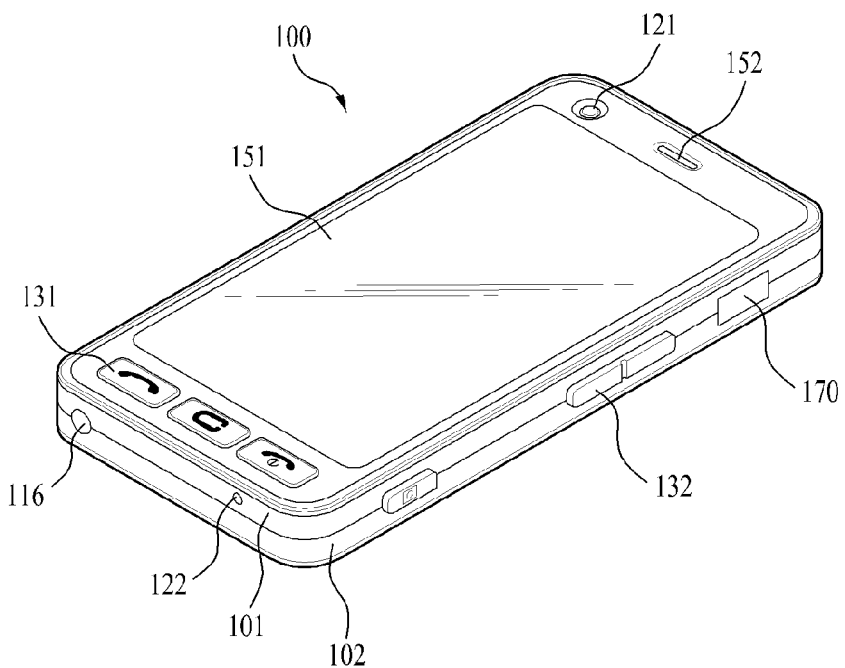
FIG. 2A is a front perspective diagram of a mobile terminal according to an embodiment of the present invention.

FIG. 2A is a front perspective view of a mobile terminal according to one embodiment of the present invention. The mobile terminal 100 illustrated in FIG. 2A has a bar type terminal body. However, the mobile terminal 100 may be implemented in a variety of different configurations.

Examples of such configurations include folder-type, slide-type, rotational-type, swing-type and combinations thereof. For ease of description, the following disclosure will primarily relate to a bar-type mobile terminal 100. However, it is understood that such disclosure may apply equally to other types of mobile terminals.

Referring to FIG. 2A, the mobile terminal 100 includes a case (a casing, housing, or cover) constituting an exterior of the mobile terminal. In the present embodiment, the case can be divided into a front case 101 and a rear case 102. Various electric/electronic parts are loaded in a space (volume) provided between the front and rear cases 101 and 102.

Optionally, at least one middle case can be further provided between the front and rear cases 101 and 102. The cases 101 and 102 are formed by injection molding of synthetic resin or can be formed of a metallic substance such as stainless steel (STS) or titanium (Ti) for example.

A display unit 151, an audio output unit 152, a camera 121, manipulating units 131 and 132, a microphone 122, and an interface unit 170 can be provided at the terminal body, and more particularly, at the front case 101. Manipulating units 131 and 132 are part of the user input unit 130 (see FIG. 1).

The display unit 151 occupies most of a main face of the front case 101. The audio output unit 152 and the camera 121 are provided at an area adjacent to an end portion of the display unit 151, while the manipulating unit 131 and the microphone 122 are provided at an area adjacent to the other end portion of the display unit 151. The manipulating unit 132 and the interface unit 170 can be provided at lateral sides of the front and rear cases 101 and 102.

The user input unit 130 may be manipulated (operated) to receive a command for controlling an operation of the terminal 100. Furthermore, the user input unit 130 may include a plurality of manipulating units 131 and 132. The manipulating units 131 and 132 can be referred to as a manipulating portion and may adopt any tactile mechanism that enables a user to perform a manipulation action by touch.

Content input by the first or second manipulating unit 131 or 132 can be divided between the two. For instance, a command such as start, end, and scroll is input via the first manipulating unit 131. Furthermore, a command for a volume adjustment of sound output from the audio output unit 152, or a command for switching to a touch recognizing mode of the display unit 151 can be input via the second manipulating unit 132.

Figure 2B:
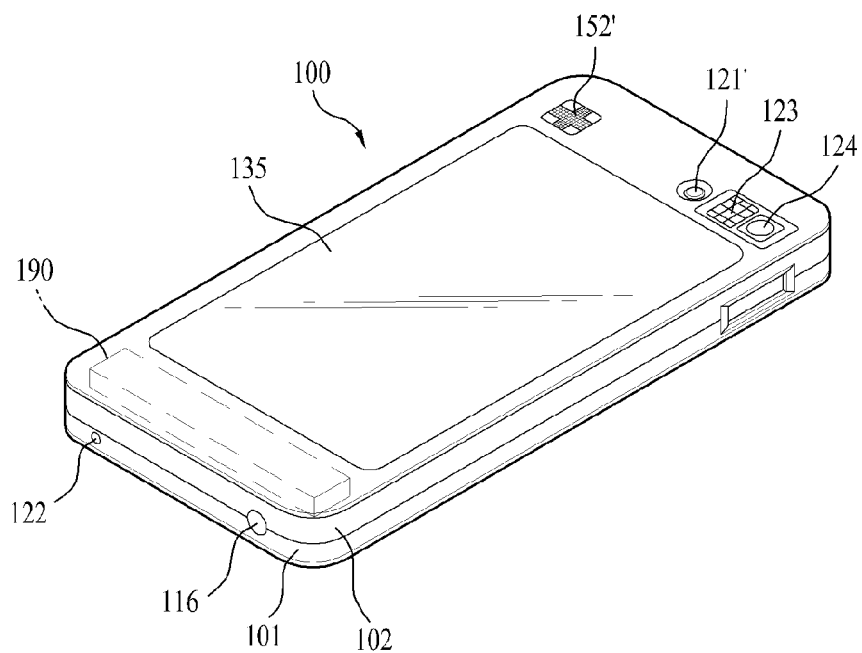
FIG. 2B is a rear perspective diagram of a mobile terminal according to an embodiment of the present invention.

FIG. 2B is a rear perspective view of the terminal of FIG. 2A. Referring to FIG. 2B, a camera 121' can be additionally provided at a rear of the terminal body, and more particularly, at the rear case 102. The camera 121' captures images along a direction that is substantially opposite to that of the camera 121 shown in FIG. 2A and may have a pixel resolution different from that of the camera 121.

According to one embodiment, for instance, the camera 121 has a relatively low number of pixels sufficient to capture and transmit a picture of a user's face for a video call, while the camera 121' has a relatively high number of pixels for capturing a photograph of a general subject. Furthermore, each of the cameras 121 and 121' can be installed on the terminal body to be rotated or popped up.

A flash 123 and a mirror 124 are additionally provided adjacent to the camera 121'. The flash 123 projects light toward a subject for photographing the subject using the camera 121'. When a user attempts to take a picture of the user (self-photography) using the camera 121', the mirror 124 enables the user to view the user's face as reflected by the mirror 124.

An additional audio output unit 152' can be provided at the rear of the terminal body. The additional audio output unit 152' is for implementing a stereo function together with the audio output unit 152 shown in FIG. 2A, and may also be used for implementing a speakerphone mode when speaking over the terminal.

A broadcast signal receiving antenna 116 can be additionally provided at the lateral side of the terminal body as well as an antenna for communication. The antenna may constitute a portion of the broadcast receiving module 111 shown in FIG. 1 and be retractable into the terminal body.

A power supply unit 190 for supplying power to the terminal 100 is provided at the terminal body. Furthermore, the power supply unit 190 can be configured to be built within the terminal body. Alternatively, the power supply unit 190 can be configured to be detachably connected to the terminal body.

A touchpad 135 for detecting a touch can be additionally provided at the rear case 102. The touchpad 135 can be configured as a light transmissive type similar to the display unit 151. In this case, if the display unit 151 is configured to output visual information from both of its faces, the visual information is viewable via the touchpad 135 as well. The information output from both of the faces can be entirely controlled by the touchpad 135. Alternatively, a display is further provided for the touchpad 135 so that a touchscreen can be provided at the rear case 102 as well.

The touchpad 135 is activated by interconnecting with the display unit 151 of the front case 101. The touchpad 135 can be provided at the rear of the display unit 151 to extend parallel to the display unit 151. The touchpad 135 can have a size equal to or smaller than the size of the display unit 151.

In the following description, preferred embodiments of the present invention are described with reference to FIGS. 3 to 29.

Figure 3:
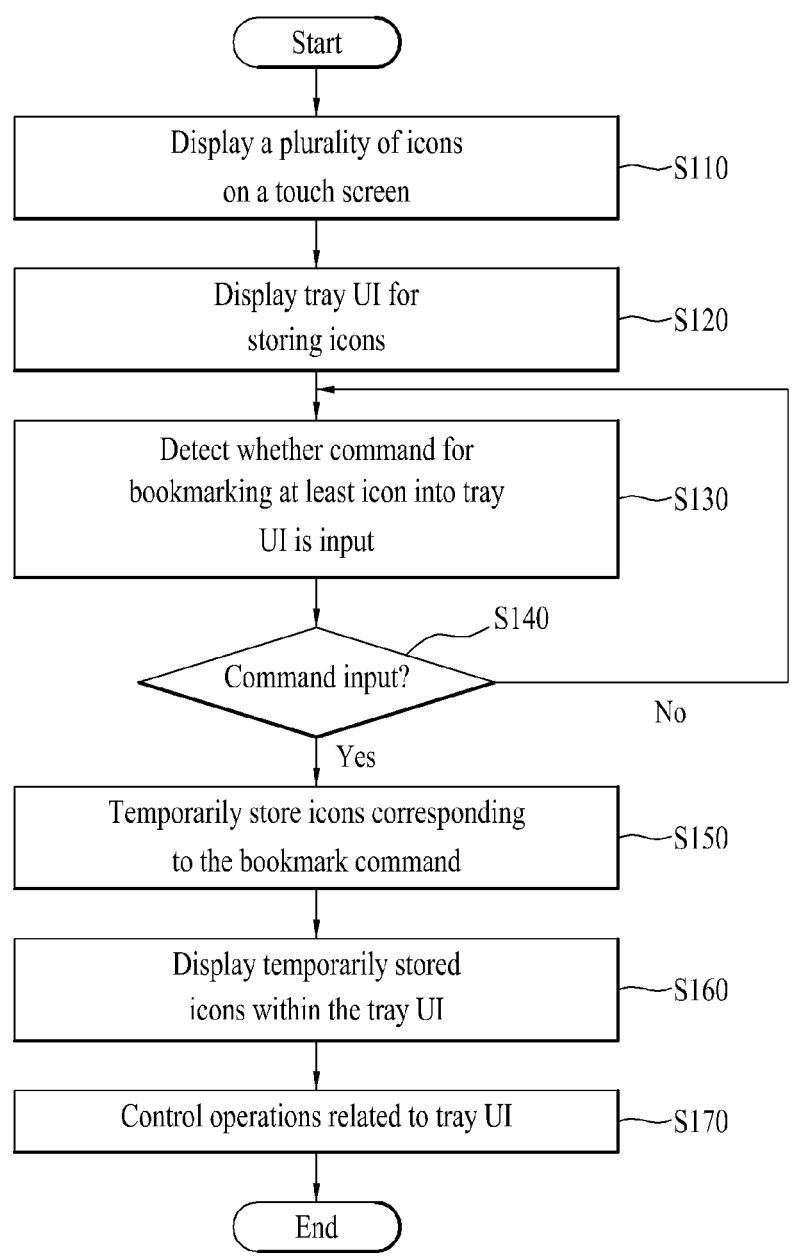
FIG. 3 is a flowchart for a process for bookmarking and executing icons on a screen via a tray UI according to an embodiment of the present invention.

According to an embodiment of the present invention, a tray UI for displaying bookmarks is displayed on a screen. FIG. 3 is a flowchart illustrating a process for bookmarking and executing icons on a screen via a tray UI according to an embodiment of the present invention.

As illustrated in FIG. 3, the controller of the mobile terminal may display a plurality of icons on a touchscreen (S110).

The icons may be associated with an application, a menu, or a file.

While the icons are displayed, the controller may display the tray UI on the screen when a user inputs a display command for displaying a tray UI via the touchscreen or the user input unit (S120).

When the tray UI is displayed, the controller detects if a command for bookmarking at least one of the icons is input by the user (S130).

When the controller detects the input of the bookmark command (S140), the controller controls information on the at least one or more icons corresponding to the bookmark command to be temporarily stored in the memory (S150) and then controls the temporarily stored at least one or more icons to be displayed within the tray UI (S160).

Subsequently, the controller 180 controls operations related to the tray UI and the at least one or more icons bookmarked in the tray UI (S170).

Figure 4:
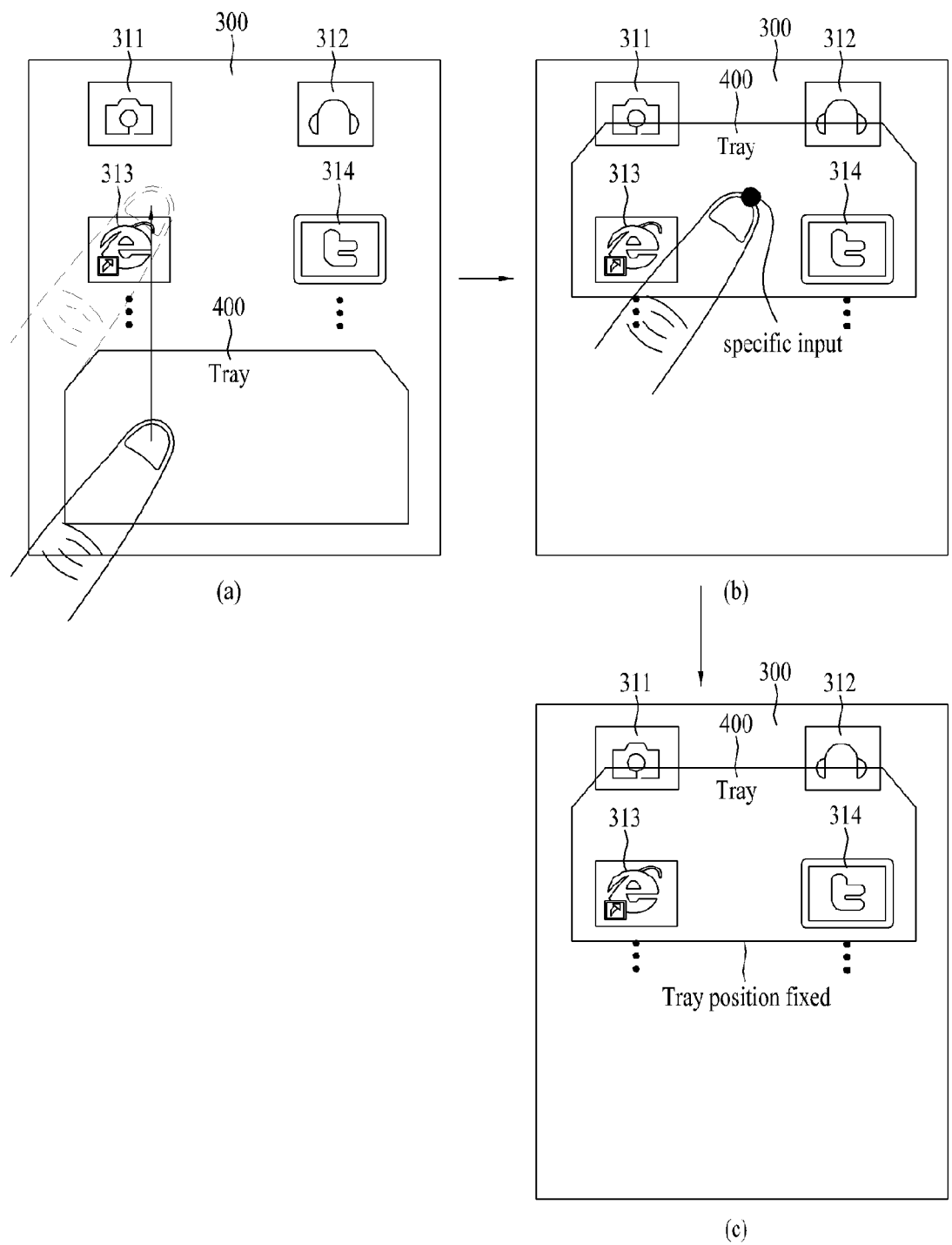
FIG. 4 illustrates adjusting a position of a tray UI according to an embodiment of the present invention.
Figure 5:
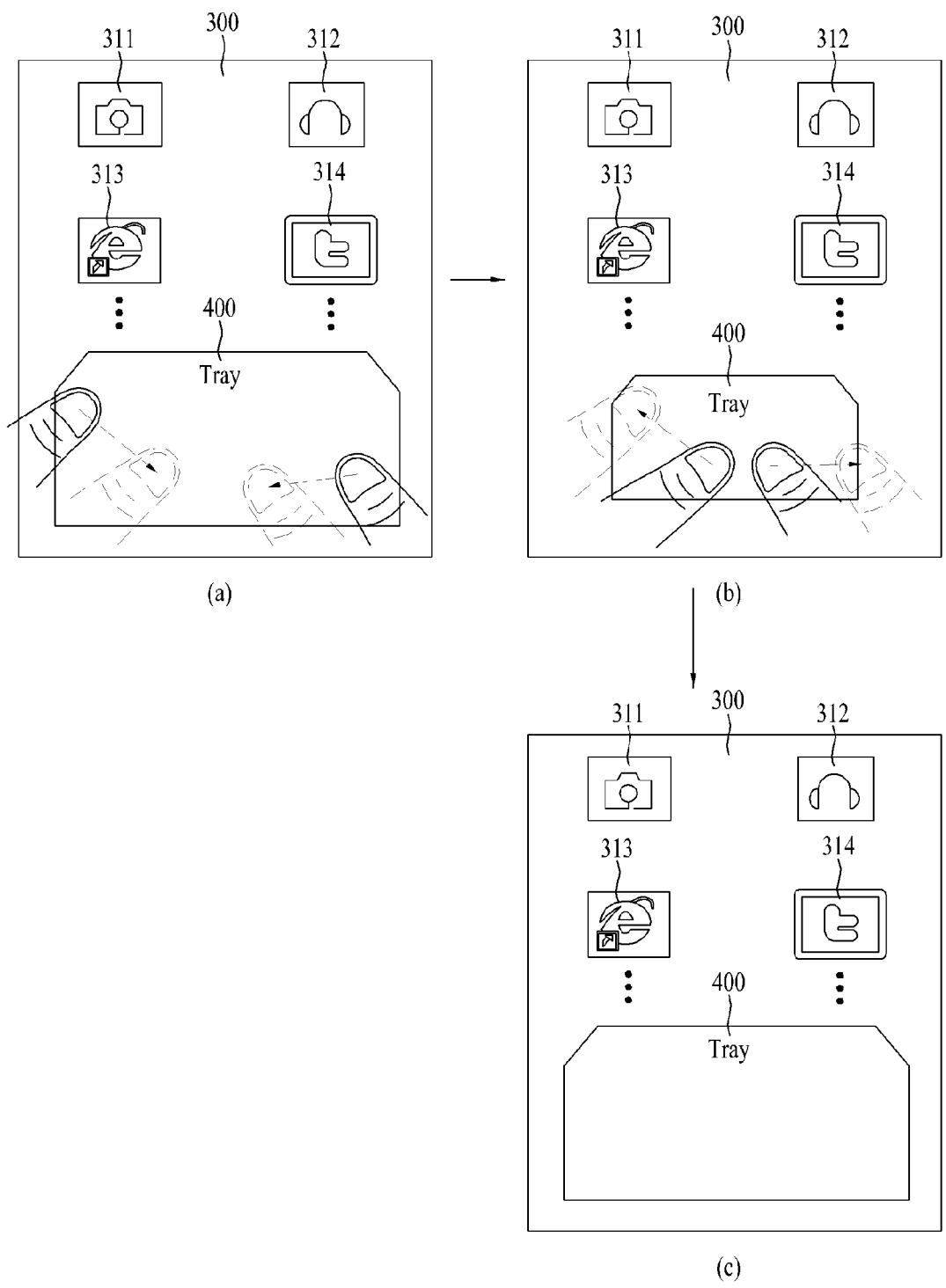
FIG. 5 illustrates adjusting a size of a tray UI according to an embodiment of the present invention.

According to one embodiment, the tray UI may be shifted on the screen and the size of the tray UI may be adjusted. FIG. 4 illustrates adjusting the position of a tray UI according to an embodiment of the present invention. FIG. 5 illustrates a process of adjusting a size of a tray UI according to an embodiment of the present invention.

As illustrated in FIG. 4(*a*), while the tray UI 400 is displayed on the screen 300, the controller 180 may shift the tray UI 400 to a position corresponding to the user's input when a touch and drag operation is performed on the tray UI 400 (FIG. 4(*b*)).

Additionally, the controller 180 may shift the tray UI 400 according to a direction key input signal of a direction key input (not shown).

After the tray UI 400 has been shifted (FIG. 4(*b*)), the controller 180 may fix the position of the tray UI 400 to the screen 300 (FIG. 4(*c*)) in response to a specific input, such as a touch input for a pre-determined period of time.

Subsequently, while the tray UI 400 is displayed on the screen 300, the controller 180 may adjust a size of the tray UI 400 in response to a user's multi-touch input. For example, as illustrated in FIG. 5(*a*) the user may input a reducing motion to reduce the tray UI (FIG. 5(*b*)), additionally as illustrated in FIG. 5(*b*), the user may input an expanding motion to expand the tray UI (FIG. 5(*c*)).

In this example, the reducing motion refers to an input wherein a distance between two initial input points decreases, while the expanding motion refers to an input wherein a distance between two initial input points increases. The size of the tray UI may be adjusted in accordance with various inputs, and is not limited to the aforementioned embodiment.

For example, the controller 180 may adjust a size of the tray UI 400 according to a direction key input (not shown).

According to embodiments of the present invention, the bookmark command may include an input performed on at least one icon, a multi-touch input between at least one icon and the tray UI 400, or an input for shifting at least one icon to the tray UI 400.

Figure 6:
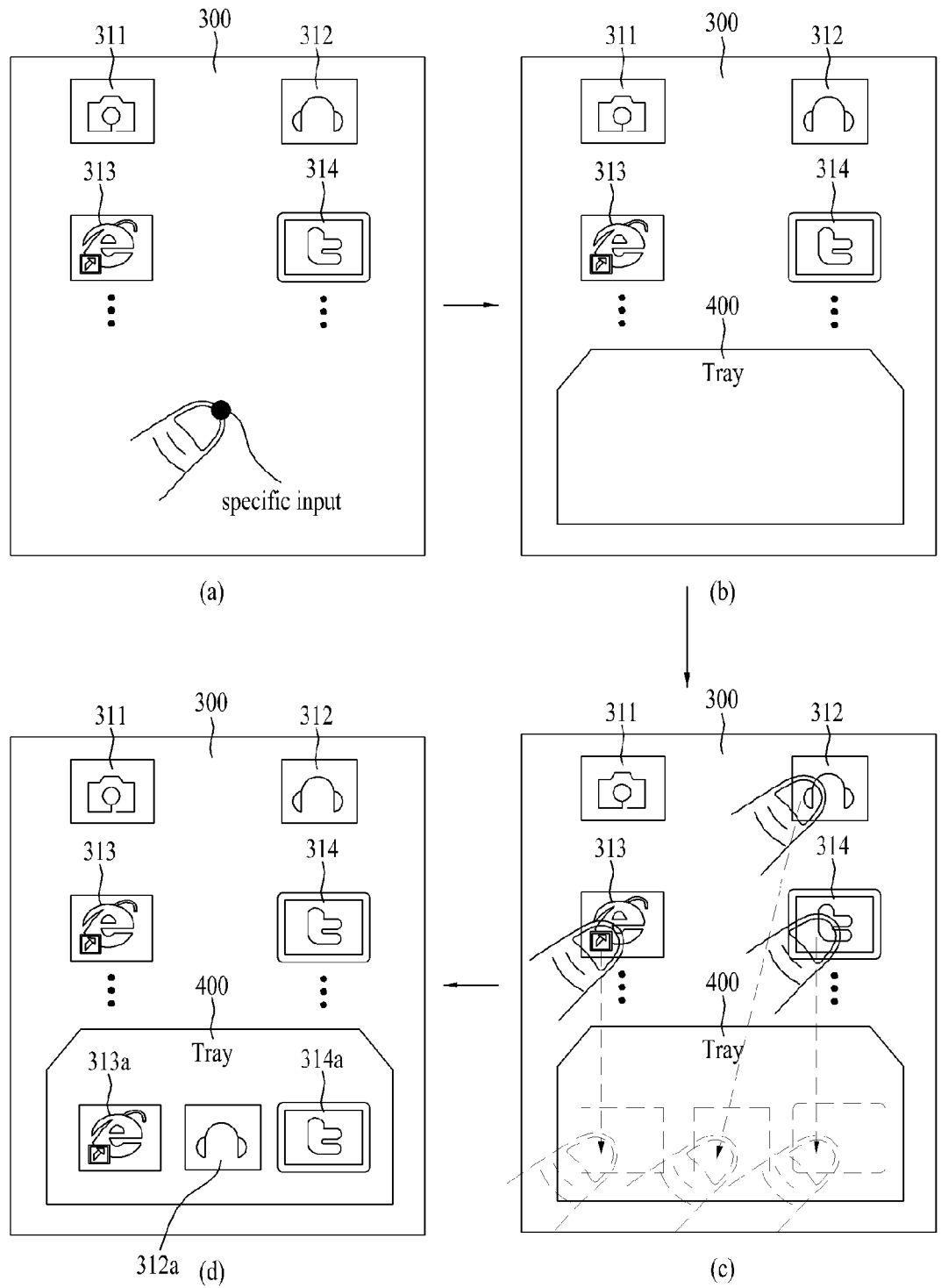
FIGS. 6 to 8 illustrate a process for bookmarking at least one or more icons into a tray UI according to an embodiment of the present invention.

As illustrated in FIG. 6, when a plurality of icons 311 to 314 are displayed on the screen 300, the controller 180 controls the tray UI 400 to be displayed on the screen 300 (FIG. 6(*b*)) after receiving an input to display the tray UI 400 (FIG. 6(*a*)).

The command for displaying the tray UI 400 may be a specific input received on the screen 300, for example, the specific input may be a touch input on the screen 300 for a predetermined period of time (FIG. 6(*a*)). Specifically, the controller 180 activates a display mode of the tray UI 400 after receiving a specific input.

The specific input may be set by the user or set during the manufacturing process. Alternatively, the specific input associated with the display command of the tray UI 400 may include a touch gesture having a preset pattern or a preset key input When the tray UI 400 is displayed, icons 312, 313, and 314 may be dragged into the tray UI 400 (FIG. 6(*c*)), the controller may then control the icons 312, 313, and 314 dragged into the tray UI 400 to be temporarily stored in the memory 160 and the temporarily stored icons 312*a*, 313*a*, and 314*a* may be displayed within the tray UI 400 (FIG. 6(*d*)).

Figure 7:
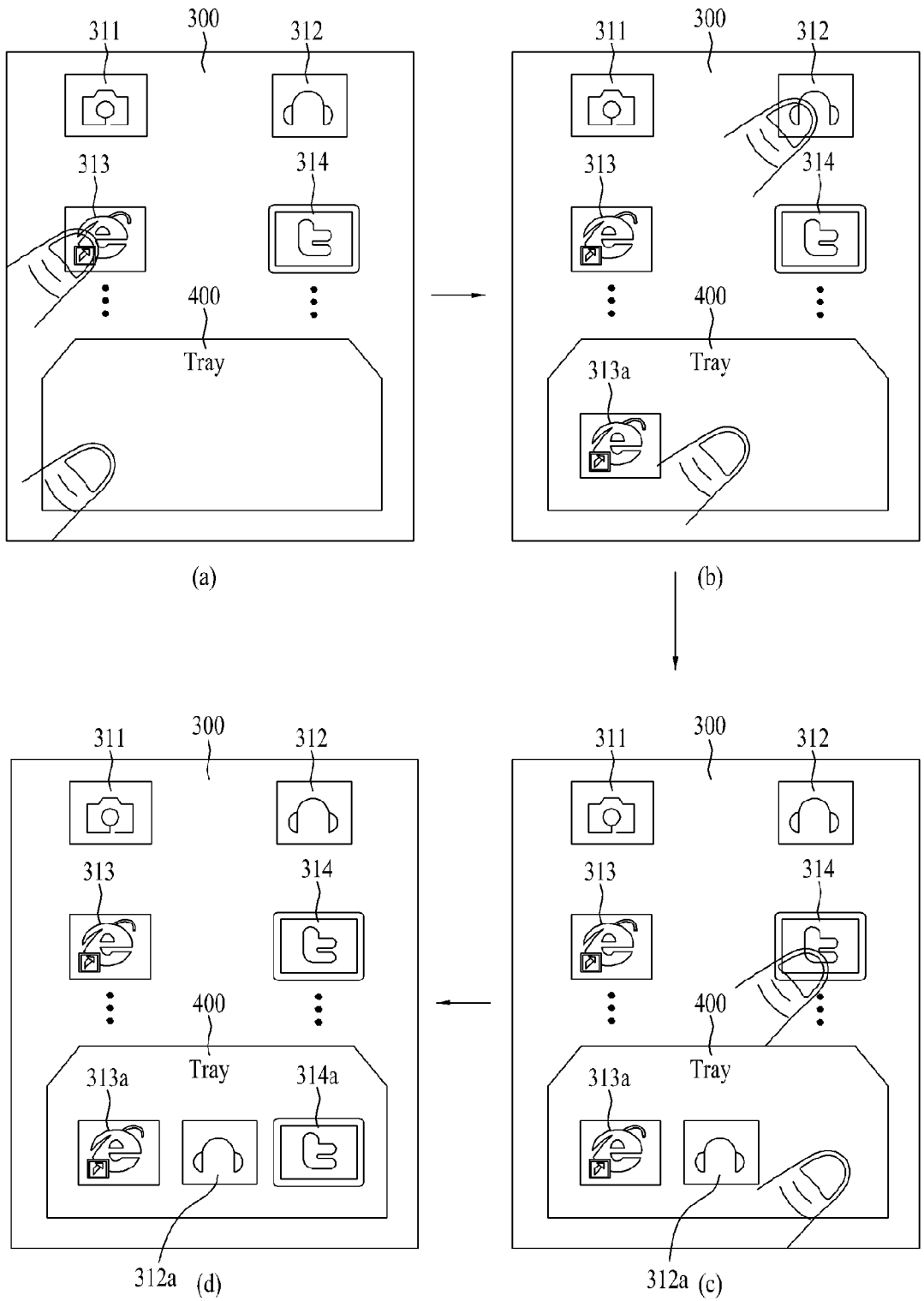

Alternatively, as illustrated in FIG. 7, when the tray UI 400 is displayed on the screen 300, the icons 312, 313, and 314 and the tray UI 400 may receive a multi-touched input (FIGS. 7(*a*)-7(*c*)). In response to the multi-touch input the controller 180 controls the icons 312, 313, and 314 to be temporarily stored in the memory 160 in order of the multi-touch and the icons 312*a*, 313*a*, and 314*a*, may be displayed within the tray UI 400 in order of the temporary storage (FIG. 7(*d*)).

Figure 8:
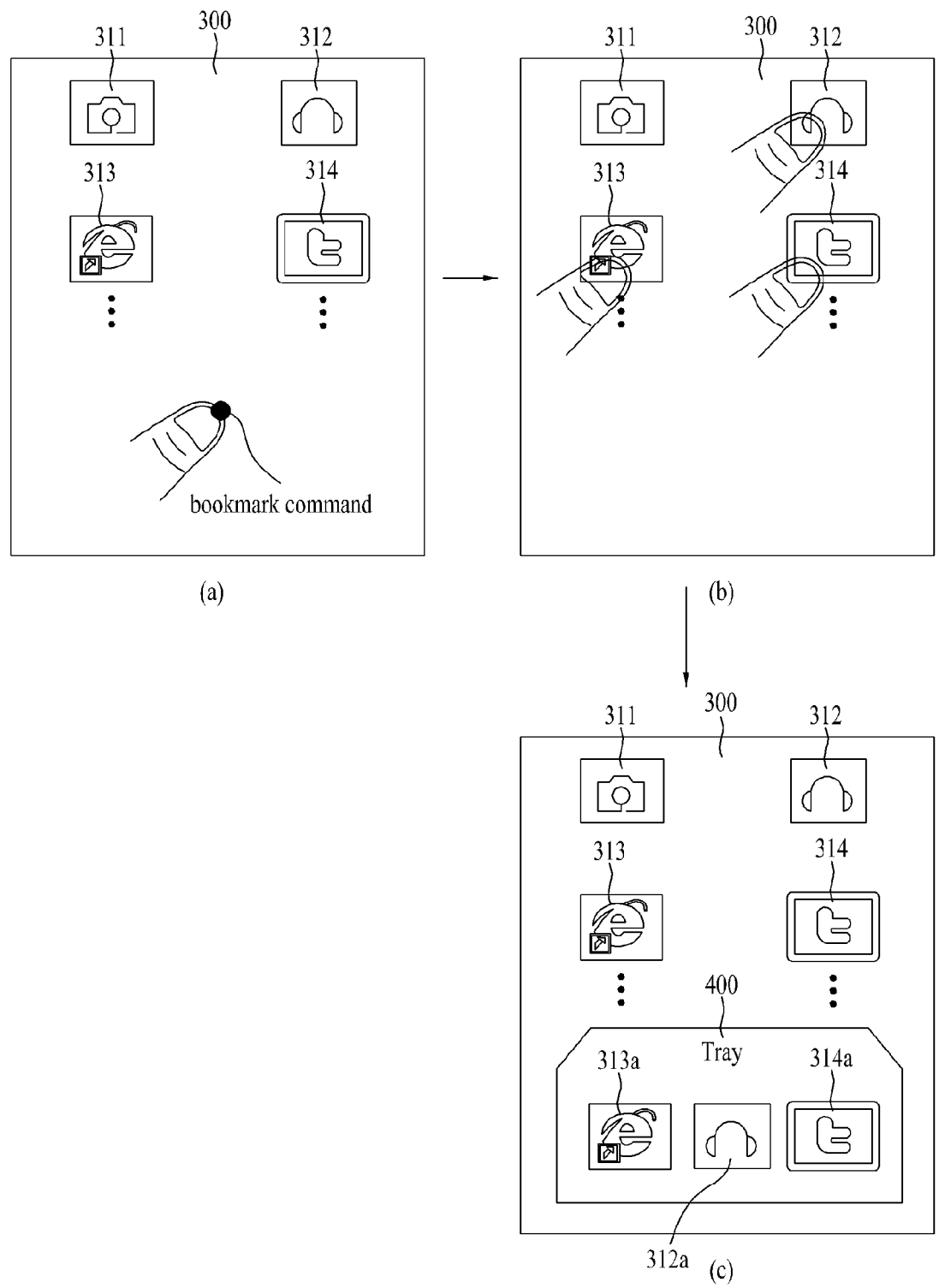

When the icons are displayed on the screen, the icons may be bookmarked after receiving a bookmark command. For example, as illustrated in FIG. 8, when the icons 311 to 314 are displayed on the screen 300, a command for bookmarking at least one of the icons 311 to 314 may be input (FIG. 8(*a*)), the icons 312 to 314 selected after receiving the bookmark command (FIG. 8(*b*)) may be temporarily stored and displayed in the tray UI 400 by the control unit 180 (FIGS. 8(*b*) and 8(*c*)). The bookmark command refers to a specific input received. The specific input may be set by the user or pre-set during manufacturing.

According to another embodiment of the present invention, the mobile terminal may inform a user of the number of icons bookmarked in a tray UI 400. FIG. 9 illustrates a process for informing a user of the number of icons bookmarked in a tray UI according to an embodiment of the present invention.

As illustrated in FIG. 9, when at least one or more icons 312*a*, 313*a*, and 314*a* are bookmarked into the tray UI 400 (FIG. 9(*a*)), the controller 180 obtains the number of the icons 312*a*, 313*a*, and 314*a* bookmarked in the tray UI 400 and then controls an information 410, indicating the obtained number of the icons, to be displayed on the tray UI 400 (FIG. 9(*b*)).

Additionally, the controller 180 may output a sound indicating the obtained number of the icons 312*a*, 313*a*, and 314*a* via the audio output module 152 (not shown).

According to another embodiment of the present invention, the icons bookmarked within the tray UI 400 may be edited. FIG. 10 illustrates a process for editing a tray UI and icons bookmarked within the tray UI according to an embodiment of the present invention.

As illustrated in FIG. 10, when at least one or more icons 312*a*, 313*a*, and 314*a* are bookmarked in the tray UI 400, the controller 180 controls the display of an edit menu 410 in response to an edit command input (FIGS. 10(*a*) and 10(*b*)).

The edit command refers to a specific input, such as a touch input for a predetermined time. The edit command may be set by the user or preset during manufacturing.

The edit menu 410 can include various menu options. For example, as illustrated in FIG. 10, the edit menu may include a modify menu 421 for modifying names of the tray UI 400 and the icons stored in the tray UI 400, a delete menu 422 for deleting the icons stored in the tray UI 400, a delete tray menu 423 for deleting the tray UI 400, and a store menu 424 for storing the tray UI 400 and the icons stored in the tray UI 400 (FIG. 10(*b*)). The menu options for the edit menu 410 are not limited to the menus displayed in FIG. 10(*b*).

When the modify menu 421 is selected, the controller 180 displays a name modify menu screen for modifying a name of at least one of the tray UI 400 or the icons stored in the tray UI 400. The controller may then modify a name of the selected object according to the newly input name.

When the delete menu 422 is selected, the controller 180 deletes the icon selected by the user from the icons stored in the in the tray UI 400.

When the delete tray menu 423 is selected, the controller 180 deletes the tray UI 400. Accordingly, the controller 180 may delete the tray UI 400 without deleting the icons bookmarked in the tray UI 400.

When the store tray menu 424 is selected, the controller 180 stores the tray UI 400 and the icons stored in the tray UI 400 in the memory 160 and links the tray UI 400 with the stored icons. If the tray UI 400 is re-executed, the controller 180 can control the icons linked to the tray UI 400 to be displayed in the tray UI 400.

According to an embodiment of the present invention, the tray UI 400 may be continuously displayed on the screen 300. FIG. 11 illustrates a process for continuously displaying a tray UI on a screen according to an embodiment of the present invention.

As illustrated in FIG. 11(*a*), icons 312*a*, 313*a*, and 314*a* may be bookmarked in the tray UI 400. As illustrated in FIG. 11(*b*), if the screen 300 displaying the tray UI 400 is switched to a different screen 300A, the controller 180 continues displaying the tray UI 400 on the different screen 300A.

Accordingly, as the tray UI 400 is displayed while the information displayed on the screen changes, a user may use a bookmark function at any time.

Figure 12:
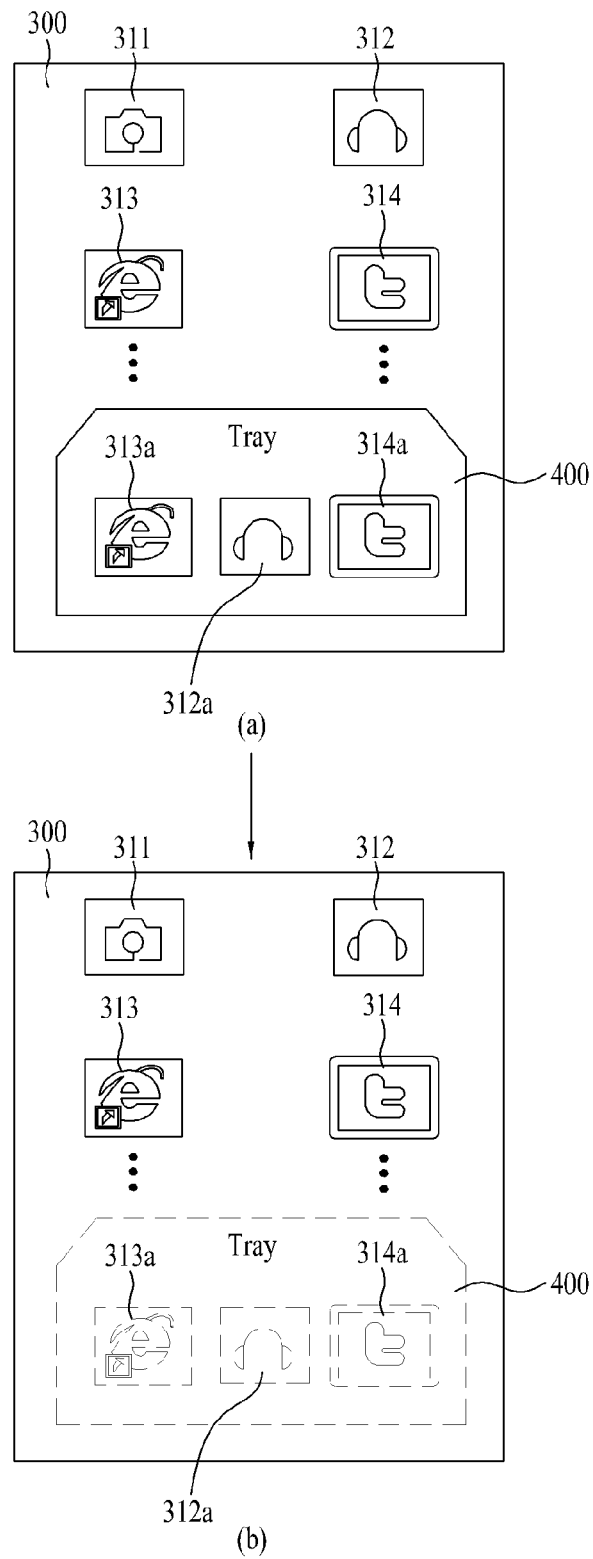

According to another embodiment of the present invention, the tray UI 400 may be transparently displayed. FIG. 12 illustrates a process for transparently displaying a tray UI on a screen according to an embodiment of the present invention.

As illustrated in FIG. 12(*a*), icons 312*a*, 313*a*, and 314*a* may be bookmarked in the tray UI 400. Once the icons 312*a*, 313*a*, and 314*a* are bookmarked in the tray UI 400, the controller 180 may control the transparent display of the tray UI 400 and the icons 312*a*, 313*a*, and 314*a* (FIG. 12(*b*)).

Additionally, the controller 180 may provide a transparency adjust menu for adjusting the transparency of the tray UI 400. Thus, the user may adjust a level of the transparency via the transparency adjust menu (not shown).

Figure 13:
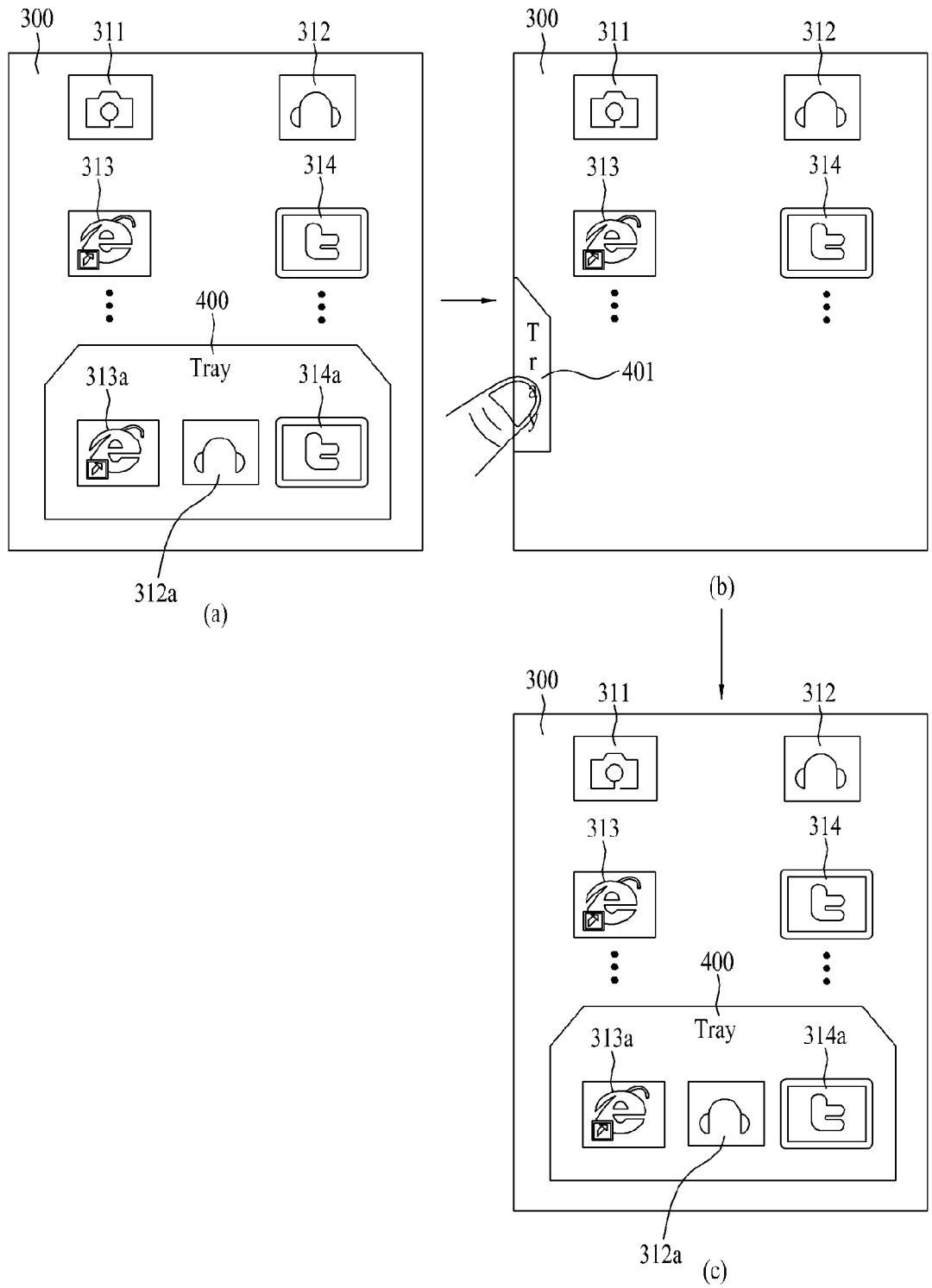
FIG. 13 illustrates a process for reducing and displaying a tray UI on a screen according to an embodiment of the present invention.

According to another embodiment of the present invention the tray UI 400 may be minimized on the screen 300. FIG. 13 illustrates a process for reducing a tray UI on a screen according to an embodiment of the present invention.

As illustrated in FIG. 13(*a*), icons 312*a*, 313*a*, and 314*a* may be bookmarked in the tray UI 400. As illustrated in FIG. 13(*b*), the controller 180 may control the tray UI 400 to be partially displayed on a lateral side of the screen 300 as a reduced tray UI 401.

Specifically, the controller 180 may display a name of the tray UI 400 on the lateral side of the screen 300. If the reduced tray UI 401 is selected, the controller 180 displays the full tray UI 400 again (FIG. 13(*c*)). The display of the reduced tray UI 401 is not limited to only displaying a name on the lateral side of the screen 300, other text or graphics may also be displayed.

Additionally, while the tray UI 400 is displayed, the controller 180 may partially display the tray UI 400 on a lateral side of the screen 300, as illustrated in FIG. 13(*b*), if the tray UI 400 is not used for a preset period of time.

According to another embodiment of the present invention, the display of the tray UI 400 may be hidden from a user. FIG. 14 illustrates a process for hiding a tray UI on a screen according to an embodiment of the present invention.

As illustrated in FIG. 14(a), icons 312a, 313a, and 314a may be displayed in the tray UI 400. While the tray UI 400 is displayed, if the tray UI 400 is not used for a preset period of time (FIG. 14(b)), the controller 180 hides the tray UI 400 from view on the screen 300.

Afterwards, a re-display command for re-displaying the hidden tray UI may be input and the controller 180 may redisplay the tray UI 400 on the screen 400 (FIGS. 14(c) and 14(d)).

According to another embodiment of the present invention the icons bookmarked in the tray UI 400 may be displayed and sorted according to the frequency of use. FIG. 15 illustrates a process for displaying icons bookmarked in a tray UI 400 in accordance with use frequency according to an embodiment of the present invention.

As illustrated in FIG. 15(a), icons 312a, 313a, and 314a may be bookmarked in the tray UI 400. The controller 180 may obtain use frequencies of the icons 312a, 313a, and 314a bookmarked in the tray UI 400 and may display the icons 312a, 313a, and 314a in order of the obtained use frequency (FIGS. 15(a) and 15(b)).

FIG. 16 illustrates a process for scrolling and displaying icons bookmarked in a tray UI 400 on a screen according to an embodiment of the present invention.

As illustrated in FIG. 16(a), icons 312a, 313a, and 314a may be bookmarked in the tray UI 400. The controller 180 may sequentially scroll the display of the icons 312a, 313a, and 314a bookmarked in the tray UI 400 (FIG. 16(a) and FIG. 16(b)).

Specifically, the controller 180 determines if the tray UI 400 can display all of the bookmarked icons 312a, 313a, and 314a. If the tray UI 400 cannot display all of the bookmarked icons 312a, 313a, and 314a, the controller may first display a limited number of icons, such as icons 312a and 313a of the bookmarked icons 312a, 313a, and 314a on the tray UI 400 (FIG. 16(a)) and then scroll to display the remaining icons 312a and 314a on the tray UI 400 (FIG. 16(b)).

Figure 17:
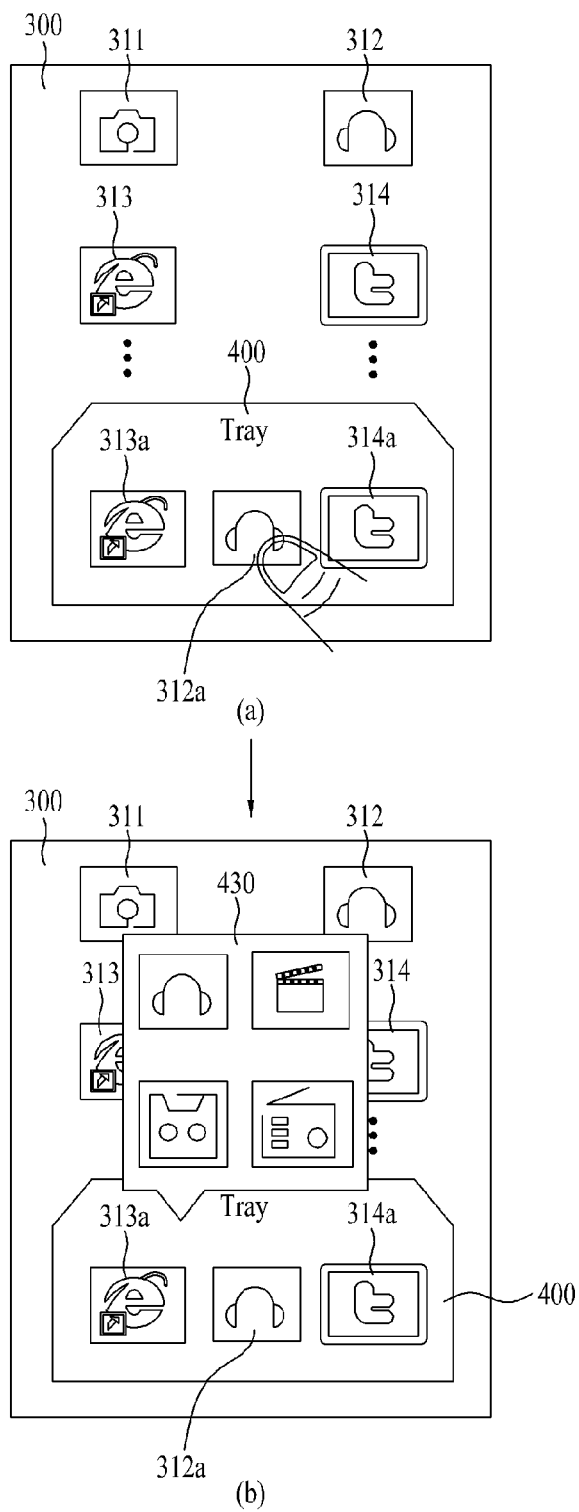
FIG. 17 illustrates a process for searching and displaying icons related to icons bookmarked in a tray UI according to an embodiment of the present invention.

FIG. 17 illustrates a process for searching for icons and displaying icons having a category related to the icons bookmarked in a tray UI according to an embodiment of the present invention.

As illustrated in FIG. 17(a), icons 312a, 313a, and 314a may be bookmarked in the tray UI 400.

When an icon 312a is selected from the bookmarked icons 312a, 313a, and 314a, the controller 180 obtains a category of a function assigned to the selected icon 312a and then searches the memory 160 for other icons having a category similar to the category of the selected icon 312a.

As illustrated in FIG. 17(b), the controller displays a list 430 of the icons found via the search.

For example, referring to FIG. 17(a), a music play function may be assigned to the selected icon 312a. The music play function may be associated with a multimedia category. Therefore, the controller 180 searches the memory 160 for the icons having the multimedia category and then displays the found icons.

Figure 18:
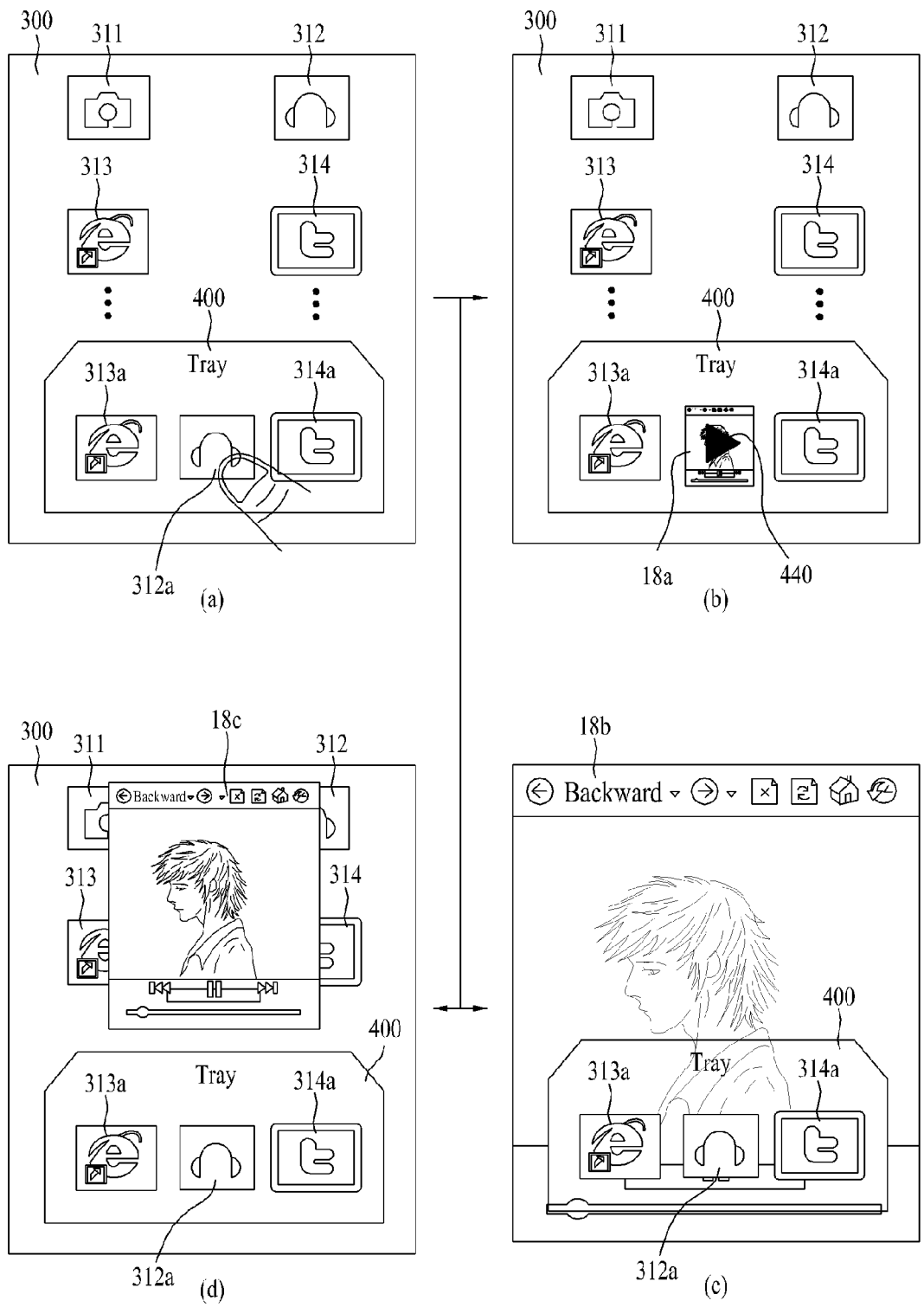
FIG. 18 and FIG. 19 illustrate a process for executing a function of an icon selected by a user from icons bookmarked in a tray UI according to an embodiment of the present invention.
Figure 19:
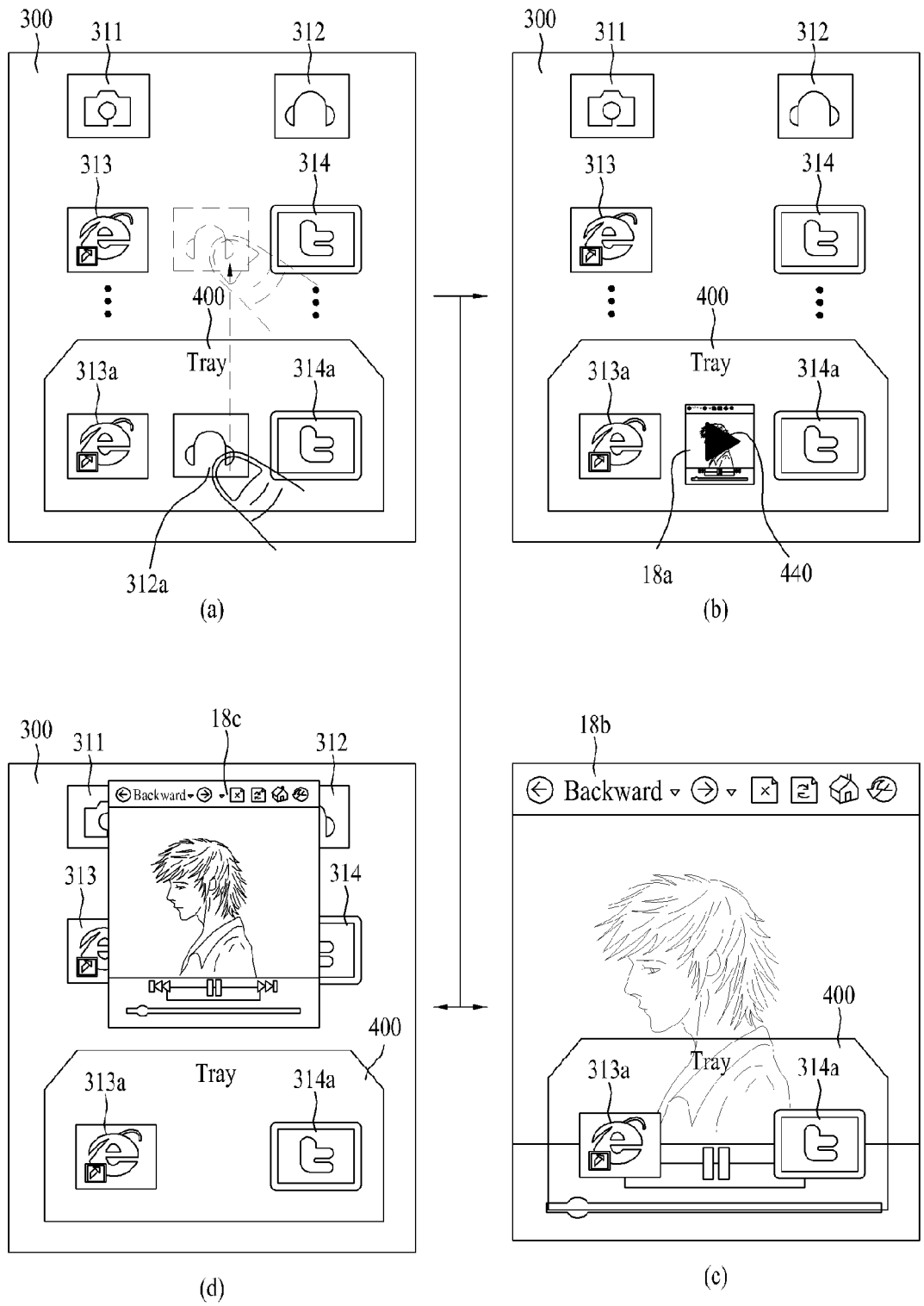

FIG. 18 and FIG. 19 illustrate a process for executing a function of an icon selected by a user from icons bookmarked in a tray UI according to an embodiment of the present invention.

As illustrated in FIG. 18(a), icons 312a, 313a, and 314a may be bookmarked in the tray UI 400. When one of the bookmarked icons 312a, 313a, and 314a is selected, the controller 180 executes a function of the selected icon and then displays an execution screen associated with the executed function (FIG. 18(b) to FIG. 18(d)).

In one example, when the function of the selected icon is executed, the controller 180 may display an execution screen of the currently executed function as a thumbnail within the tray UI 400. For example, as illustrated in FIG. 18(b), after selecting an icon 312a (FIG. 18(a)) the controller may display the thumbnail execution screen 18a.

As a second example, as illustrated in FIG. 18(c), when the function of the selected icon 312a is executed, the controller 180 switches a current screen 300 to full-screen execution screen 18b.

Finally, when the function of the selected icon 312a is executed, the controller 180 may display a popup execution screen 18c on the current screen 300.

Moreover, the controller 180 may display an execution icon 440, which indicates that the function for the selected icon 312a is currently executed. The execution icon 440 may be displayed within the execution screen of the function.

Subsequently, when an icon selected from the bookmarked icons 312a, 313a, and 314a is dragged and dropped outside the tray UI 400 (FIG. 19(a)), the controller 180 may execute the function associated with the selected icon and may display an execution screen associated with the executed function (FIG. 19(b) to FIG. 19(d)).

The process of executing a function as illustrated FIGS. 19(b) to 19(d) is similar to the process described above with regard to FIGS. 18(b) to 18(d).

Figure 21:
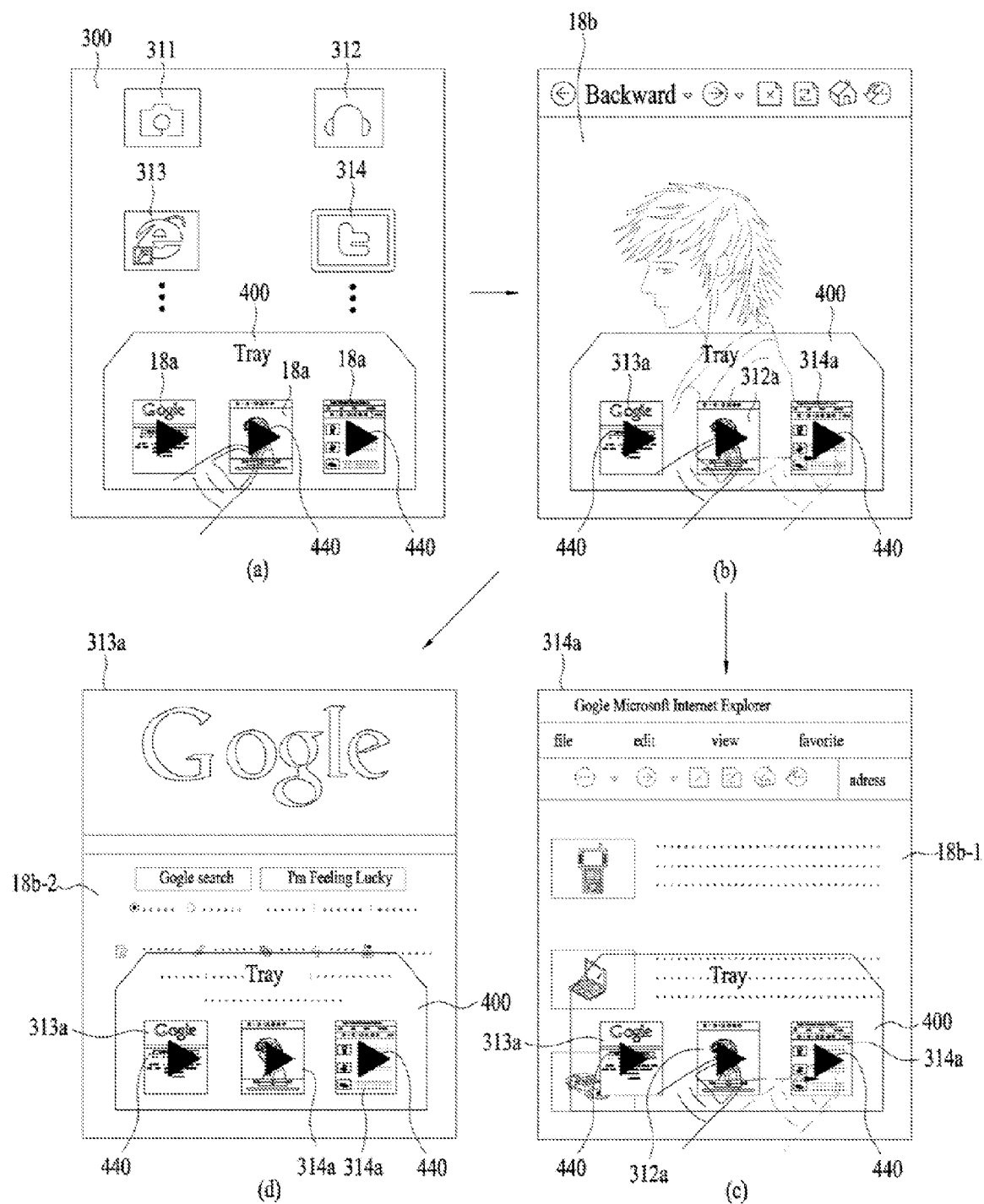

FIG. 20 and FIG. 21 illustrate a process for executing functions of icons bookmarked in a tray UI according to an embodiment of the present invention.

As illustrated in FIG. 20, icons 312a, 313a, and 314a may be bookmarked in the tray UI 400 (FIG. 20(a)). The controller may execute a function respectively assigned to each of the bookmarked icons (FIG. 20(b)).

In this example, the executed screens of the currently executed functions are displayed as thumbnails (FIG. 20(b)). The process of executing a function as illustrated FIG. 20(b) is similar to the process described above with regard to FIG. 18(b).

While the thumbnail execution screens 18a are displayed (FIG. 21), the controller 180 may display another execution screen in response to an input. Specifically, when a thumbnail execution screen 18a is selected (FIG. 21(a)), the controller 180 switches a current screen 300 to the full-screen execution screen 18b (FIG. 21(b)).

The currently displayed full-screen execution screen 18b may be switched in response to an input. The input may be received on the full-screen execution screen 18b or on the tray UI 400. As illustrated in to FIG. 21(c), the controller 180 switches the full-screen execution screen 18b of FIG. 21(b) to a different full-screen execution screen 18b-1 in response to a scroll input on the tray UI 400.

Furthermore, the direction of the scroll input may determine the displayed full-screen execution screen 18b. As illustrated in to FIG. 21(d), the controller 180 may switch the full-screen execution screen 18b of FIG. 21(b) to a different full-screen execution screen 18b-2 in response to a scroll input on the tray UI 400. Accordingly, the full-screen execution screen 18b-2 of FIG. 21(d) is different than the full-screen execution screen 18b-1 of FIG. 21(c) due to the different direction of the scroll input on the tray UI 400 (not shown).

Furthermore, the full-screen execution screens 18b-1 and 18b-2 displayed in FIGS. 21(c) and 21(d) may be further changed in response to a scroll input.

Moreover, the controller 180 may display the executed screen of the corresponding function as a popup window in response to the scroll input.

Figure 22:
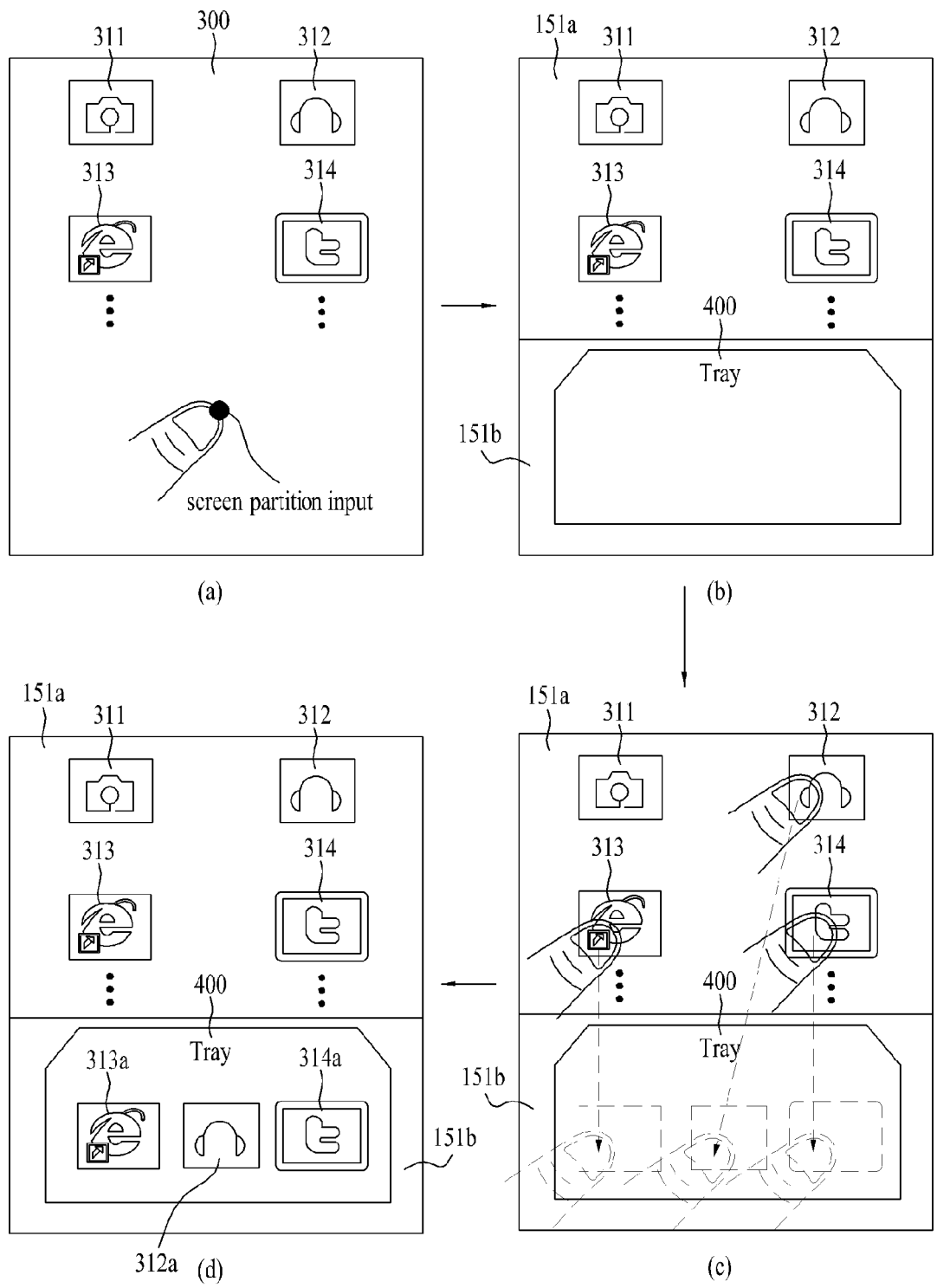
FIG. 22 illustrates a process for partitioning a screen into a plurality of regions according to an embodiment of the present invention.

FIG. 22 illustrates a process for partitioning a screen into a plurality of regions and displaying an original copy of the screen and a tray UI including bookmarked icons on the regions, respectively, according to an embodiment of the present invention.

As illustrated in FIG. 22, when a command for partitioning a screen is input, the controller 180 may partition the screen 300 into a plurality of regions including a first region 151*a* and a second region 151*b*. The command for partitioning the screen may be a touch input for a period of time or another type of distinct input. The controller 180 controls the icons 311, 312, 313, and 314 to be displayed on the first region 151*a* and controls a tray UI 400 to be displayed on the second region 151*b* (FIG. 22(*b*)).

After partitioning the screen, the icons displayed in a first region may be dragged to a second region to be bookmarked. For example, when the icons 312, 313, and 314 are dragged to the tray UI 400 (FIG. 22(*c*)), the controller may temporarily store the dragged icons 312, 313, and 314 in the memory 160 and then control the temporarily stored icons 312*a*, 313*a*, and 314*a* to be bookmarked in the tray UI 400 (FIG. 22 (*d*)).

FIG. 23 illustrates a process for locking a screen while a tray UI having icons bookmarked therein remains unlocked according to an embodiment of the present invention.

As illustrated in FIG. 23(*a*), icons 312*a*, 313*a*, and 314*a* may be bookmarked in the tray UI 400.

When a command for locking part of the screen 300 is input to the screen 300 (FIG. 23(*a*)), the controller 180 locks the entire screen 300 except for the tray UI 400.

Moreover, as illustrated in FIG. 23(*b*), the controller controls a display of a lock icon 451, which indicates a lock state of the screen 300. The controller also displays an un-lock icon 452, which indicates an un-lock state of the screen 300. Finally, the controller controls a display of a tray UI lock icon 453 to be displayed on the tray UI 400. The tray UI lock icon 453 controls the lock state of the tray UI 400.

In this example, the controller 180 may lock the tray UI 400 when the lock icon 453 is selected while the tray UI 400 is in an unlocked state (not shown).

Another embodiment of the present invention relates to a process of displaying the aforementioned tray UI and bookmarking a currently executed content screen via the tray UI. Additionally, the bookmarked content screen may then be re-executed.

Figure 24:
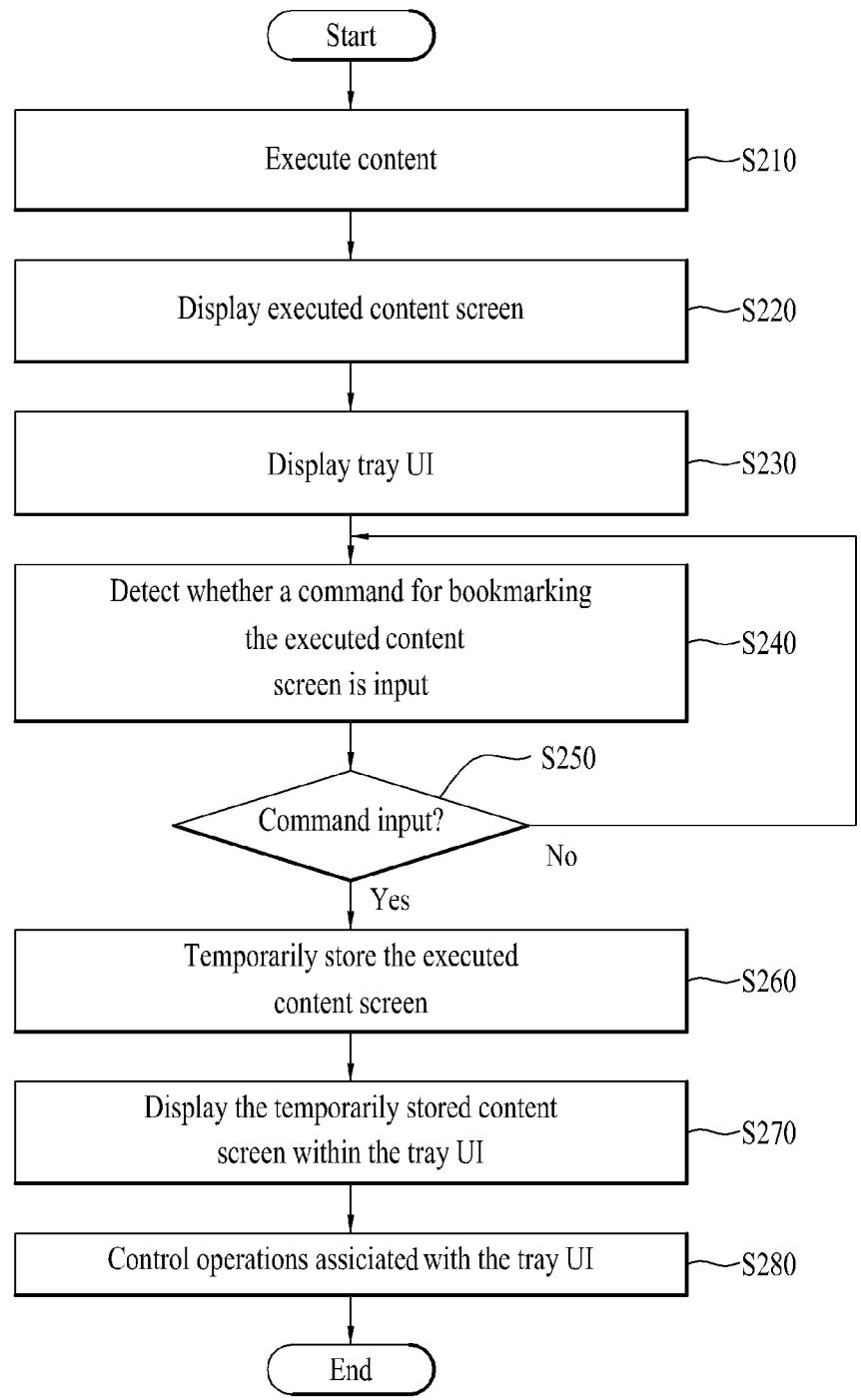
FIG. 24 is a flowchart for a process for bookmarking and re-executing a currently executed content screen using a tray UI according to an embodiment of the present invention.

FIG. 24 is a flowchart illustrating a process for bookmarking a currently executed content screen via a tray UI and re-executing the bookmarked content screen according to an embodiment of the present invention.

FIGS. 25 to 29 illustrate screen configurations of a process for bookmarking and re-executing a currently executed content screen using a tray UI according to an embodiment of the present invention.

As illustrated in FIG. 24, the controller executes the content (S210) when a user inputs a command for executing the content. The executed content screen is then displayed (S220).

In this example, the content includes a stored content or content which may be accessed via the mobile terminal. Moreover, the content may include data such as a contact information, an incoming/outgoing message, an outgoing/incoming call history, an email, a music file, a video file, an image file, a schedule information, a document file, a game file, a webpage address file, an application, a folder, and the like.

While the currently executed content screen is displayed, the controller 180 controls the tray UI to be displayed on the content screen (S230) when the user inputs a command for displaying a tray UI.

In this example, as mentioned in the foregoing description with reference to FIG. 4 and FIG. 5, a position of the tray UI can be shifted or fixed on the content screen. Additionally, the size of the tray UI is variable.

The controller detects whether a command for bookmarking the currently executed content screen is input (S240) when the tray UI is displayed.

In this example, the bookmark command may include, but is not limited to, a touch action performed on the content screen to bookmark the currently executed content screen, a multi-touch action between the content screen and the tray UI, or a touch action to shift the content screen into the tray UI.

Accordingly, if the bookmark command is input (S250), the controller 180 controls the currently displayed content screen to be temporarily stored in the memory 160 (S260) and then controls the stored content screen to be displayed within the tray UI (S270).

Subsequently, the controller 180 controls operations related to the tray UI and the the content screen bookmarked in the tray UI (S280).

Figure 25:
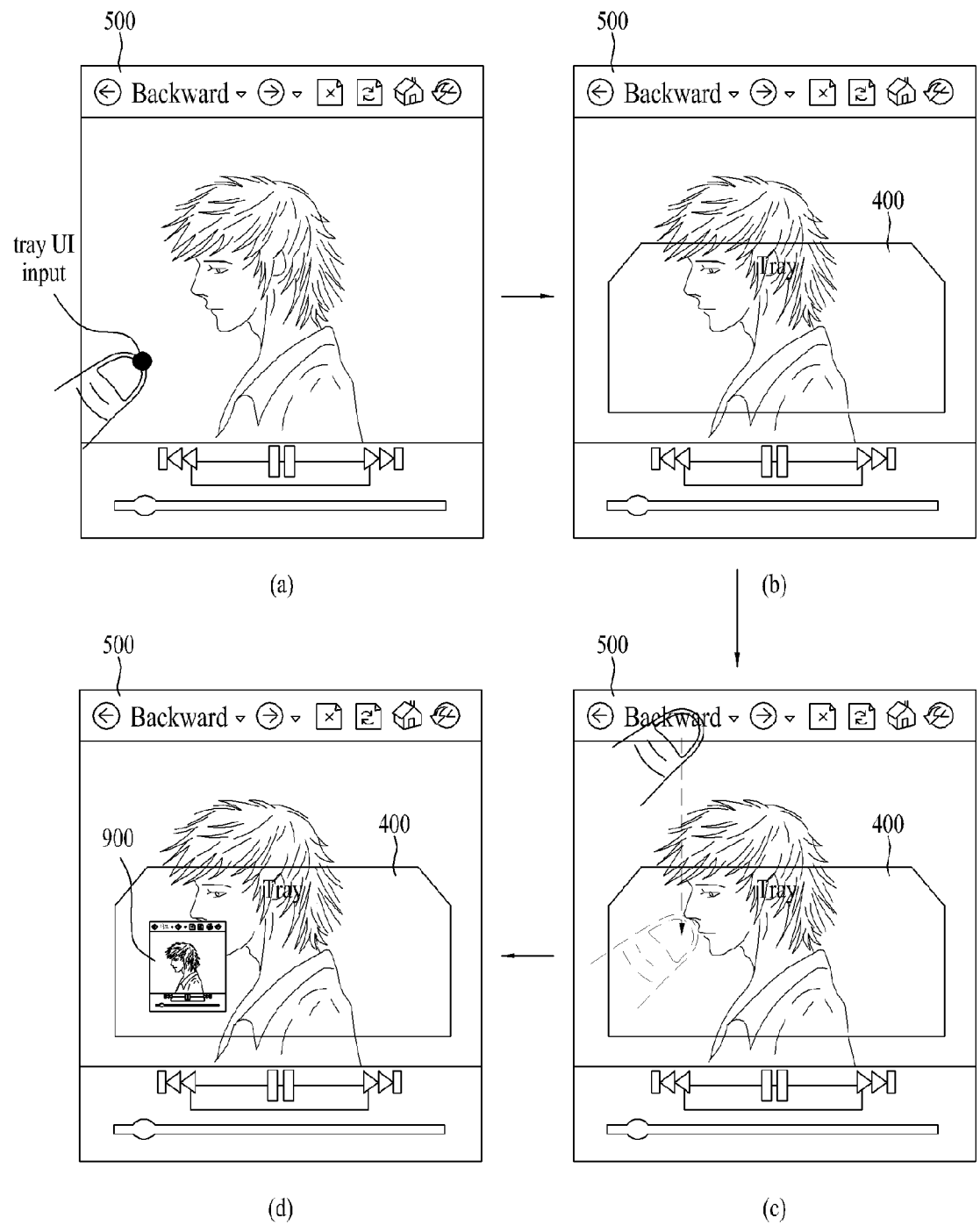
FIG. 25 and FIG. 26 illustrate a process for bookmarking a currently executed content screen according to an embodiment of the present invention.
Figure 26:
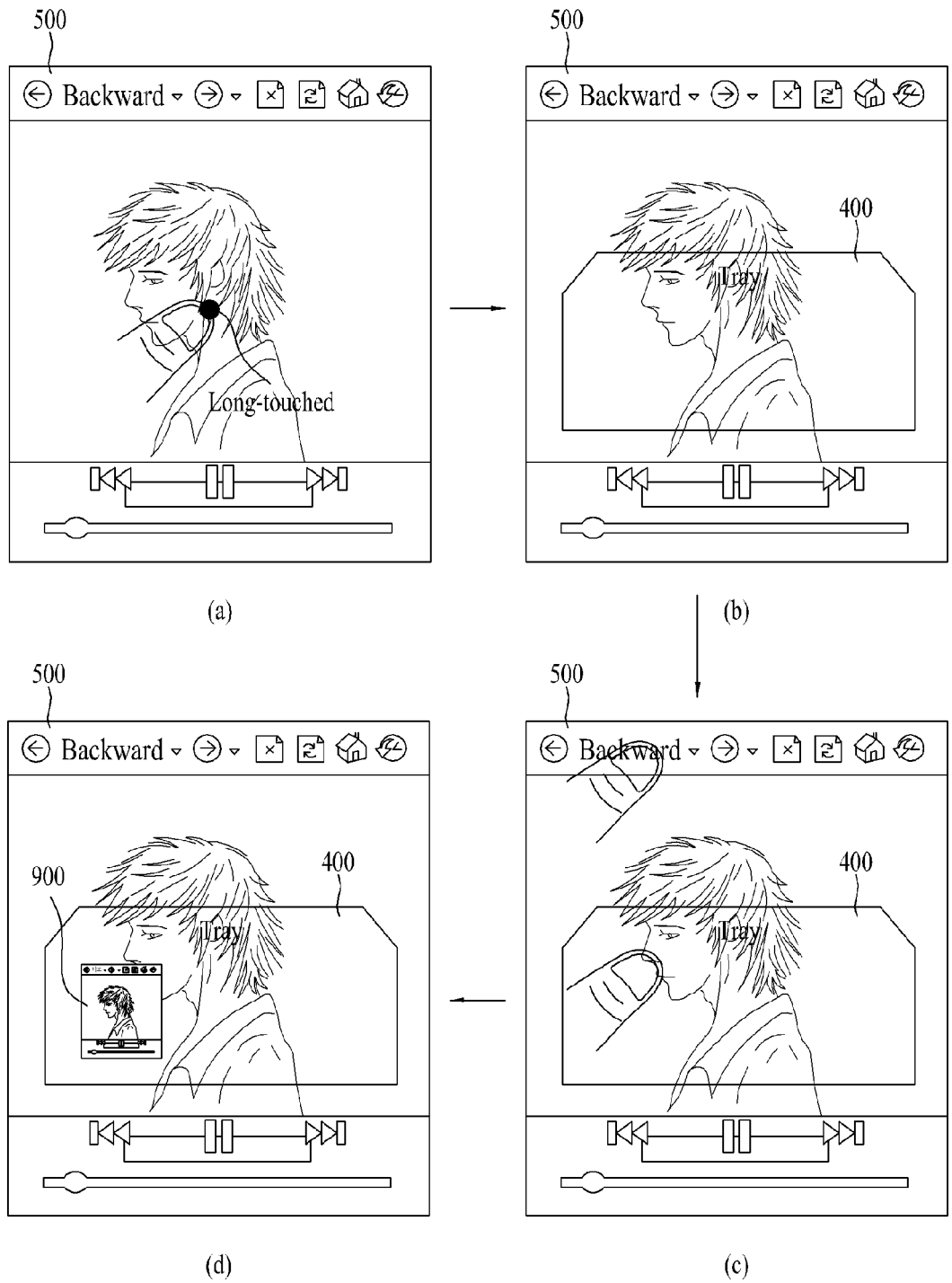

FIG. 25 and FIG. 26 illustrate example processes for bookmarking a currently executed content screen into a tray UI 400 according to various embodiments of the present invention.

As illustrated in FIG. 25 and FIG. 26, the tray UI 400 may be displayed after the content has been executed. For example, when the content screen 500 of the currently executed content is displayed, a user may input a command to display the tray UI 400 (tray UI input in FIG. 25(*a*) and long-touched input in FIG. 26(*a*)) and the controller 180 controls the tray UI 400 to be displayed on the content screen 500 in response to the input (FIG. 25(*b*) and FIG. 26(*b*)).

The input to display the tray UI 400 may be a touch input for a predetermined period of time or may be another type of input. For example, the input to display the tray UI 400 may include an input having a preset specific pattern or a preset specific key input (not shown).

In one example embodiment, while the tray UI 400 is displayed, if at least a portion of the content screen 500 is dragged into the tray UI 400 (FIG. 25(*c*)), the controller controls an image of the currently displayed content screen 500 to be temporarily stored in the memory 160 and then controls the temporarily stored image of the content screen 500 to be displayed within the tray UI 400 as a thumbnail 900 (FIG. 25(*d*)).

When the image of the content screen 500 is stored in the memory 160, the controller 180 controls the name of the content and information regarding a time corresponding to the content to be stored in the memory 160.

The time corresponds to the point at which the content was bookmarked. For example, if the bookmark command is input at "3 minutes and 50 seconds," the stored time would be "3 minutes and 50 seconds."

In another example embodiment, while the tray UI 400 is displayed on the currently executed content screen 500, if the content screen 500 and the tray UI 400 are simultaneously touched (FIG. 26(*c*)), the controller controls an image of the currently displayed content screen 500 to be temporarily stored in the memory 160 and controls the temporarily stored image of the content screen 500 to be displayed within the tray UI 400 as a thumbnail 900 (FIG. 26(*d*)).

FIG. 27 illustrates a process for displaying a content screen bookmarked in a tray UI according to an embodiment of the present invention.

As illustrated in FIG. 27(a), the controller 180 is able to display the bookmarked content screen 500 as a thumbnail 900. As illustrated in FIG. 27(b), the controller 180 may display information associated with the content, such as a name or a playing time, of the bookmarked content screen 500 to be displayed within the thumbnail 900.

FIG. 28 and FIG. 29 illustrate a process for re-executing a content screen bookmarked in a tray UI according to an embodiment of the present invention.

As illustrated in FIG. 28(a), a plurality of content screens may bookmarked in the tray UI 400, if one of the displayed thumbnails 900 is selected, the controller 180 re-executes the selected content by setting an execution start point to stored time associated with the selected thumbnail 900 and then displays the re-executed content 501 (FIG. 28(b)).

Accordingly, as illustrated in FIG. 28(b), the controller 180 switches a current screen 500A to the re-executed content screen 501. Alternatively, the controller 180 is able to display the re-executed content screen 501 within the tray UI 400 (not shown). Furthermore, the controller 180 may display the re-executed content screen 501 as a popup window on the current screen 500A (not shown).

As illustrated in FIG. 29(a), a plurality of content screens may bookmarked in the tray UI 400, if one of the displayed thumbnails 900 is dragged and dropped outside the tray UI 400, the controller 180 re-executes the selected content by setting an execution start point to stored time associated with the selected thumbnail 900 and then displays the re-executed content 501 (FIG. 29(b)).

The embodiments described above may be modified to inform the user of the number of the bookmarked content screens when a plurality of content screens are bookmarked in the tray UI 400. Moreover, the embodiments described with regard to FIGS. 3-23 may also be applied to the embodiments described with regard to FIGS. 24-29.

As described above, a user is allowed to bookmark at least one frequently used icon amongst numerous icons, thereby enabling the user to quickly access functions of the bookmarked icons.

In addition, a user can re-execute content which has been bookmarked in a tray UI.

It will be apparent to those skilled in the art that various modifications and variations can be specified into other forms without departing from the spirit or scope of the inventions.

For instance, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
    a memory;
    a touchscreen configured to display a screen including a plurality of icons; and
    a controller configured to:
        cause the touchscreen to display on the screen a UI (user interface) for bookmarking icons,
        cause the memory to store information of the plurality of icons in response to a command for bookmarking the plurality of icons,
        cause the touchscreen to display the bookmarked plurality of icons within the UI,
        simultaneously execute a plurality of applications each associated with a corresponding icon of the plurality of icons displayed within the UI,
        cause the touchscreen to display a plurality of preview thumbnail images for the plurality of icons displayed within the UI, each preview thumbnail image corresponding to an execution screen of an application associated with a corresponding icon,
        cause the touchscreen to display a first execution screen of a first application of the plurality of applications corresponding to a first preview thumbnail image of the plurality of preview thumbnail images and to continuously display the UI,
        cause the touchscreen to switch from the first execution screen to display a second execution screen of a second application of the plurality of applications corresponding to a second preview thumbnail image of the plurality of preview thumbnail images in response to an input to the UI scrolling from the first preview thumbnail image to the second preview thumbnail image, and
        cause the touchscreen to continuously display the UI on the second execution screen when the first execution screen is switched to the second execution screen.

2. The mobile terminal of claim 1, wherein the command for bookmarking comprises a touch and drag input to an icon dragging the icon into the UI.

3. The mobile terminal of claim 1, wherein the command for bookmarking comprises a simultaneous touch input to an icon and the UI.

4. The mobile terminal of claim 1, wherein a size or a position of the UI may be edited based on a user input to the mobile terminal.

5. The mobile terminal of claim 1, wherein the controller is further configured to cause the memory to store the UI.

6. The mobile terminal of claim 1, wherein the controller is further configured to:
    cause the touchscreen to change the UI from a fully-displayed state to a reduced state, the reduced state including only a part of the UI displayed on a side of the touchscreen, and cause the touchscreen to change the UI from the reduced state to the fully-displayed state in response to an input selecting the displayed part of the UI when in the reduced state.

7. The mobile terminal of claim 1, wherein the controller is further configured to:
    cause the UI to be hidden when the UI is not used for a threshold period of time, and
    cause the hidden UI to be re-displayed in response to a command for displaying the hidden UI.

8. The mobile terminal of claim 1, wherein the controller is further configured to cause the touchscreen to display information indicating a number of icons bookmarked within the UI.

9. The mobile terminal of claim 1, wherein the controller is further configured to cause the touchscreen to display the plurality of icons in the UI by sequentially scrolling the icons.

10. The mobile terminal of claim 1, wherein the controller is further configured to detect a selection of an icon of the plurality of icons and to execute a function assigned to the selected icon in response to the selection.

11. The mobile terminal of claim 1, wherein the controller is further configured to execute a function assigned to an icon of the plurality of icons when the icon is moved outside the UI.

12. The mobile terminal of claim 1, wherein the controller is further configured to partition the screen of the touchscreen into a first region for displaying icons on the screen and a second region for displaying the UI.

13. The mobile terminal of claim 1, wherein the controller is further configured to:
cause the touchscreen to display video content on the screen,
cause the memory to store a video frame image of the video content corresponding to a timestamp in response to receiving a command for bookmarking the video content, and
cause the touchscreen to display the video frame image within the UI.

14. The mobile terminal of claim 13, wherein the command for bookmarking comprises a touch and drag input to the displayed video content dragging at least a portion of the displayed video content into the UI.

15. The mobile terminal of claim 13, wherein the command for bookmarking comprises a simultaneous touch input to the displayed video content and the UI.

16. The mobile terminal of claim 13, wherein the controller is further configured to cause the touchscreen to display a thumbnail image associated with the video frame image within the UI.

17. The mobile terminal of claim 13, wherein the controller is further configured to cause the touchscreen to display a name of the video content and the timestamp associated with the video frame image within the UI.

18. The mobile terminal of claim 13, wherein the controller is further configured to cause the touchscreen to display the video content starting from the timestamp when the displayed video frame image within the UI is selected.

19. The mobile terminal of claim 13, wherein the controller is further configured to cause the touchscreen to display the video content starting from the timestamp in response to a touch and drag input to the displayed video frame image dragging the video frame image out of the UI.

20. A method of bookmarking icons of a mobile terminal, the method comprising:
displaying a screen including a plurality of icons via a touchscreen;
displaying a UI (user interface) on the screen for bookmarking icons;
storing information of the plurality of icons in response to a command for bookmarking the plurality of icons;
displaying the bookmarked plurality of icons within the UI;
simultaneously executing a plurality of applications each associated with a corresponding icon of the plurality of icons displayed within the UI;
displaying a plurality of preview thumbnail images for the plurality of icons displayed within the UI, each preview thumbnail image corresponding to an execution screen of an application associated with a corresponding icon;
displaying a first execution screen of a first application of the plurality of applications corresponding to a first preview thumbnail image of the plurality of preview thumbnail images while continuously displaying the UI;
ceasing display of the first execution screen and displaying a second execution screen of a second application of the plurality of applications corresponding to a second preview thumbnail image of the plurality of preview thumbnail images in response to an input to the UI scrolling from the first preview thumbnail image to the second preview thumbnail image; and
continuously displaying the UI on the second execution screen when the first execution screen is switched to the second execution screen.

21. The method of claim 20, wherein the command for bookmarking comprises a touch and drag input to an icon dragging the icon into the UI.

22. The method of claim 20, wherein the command for bookmarking comprises a simultaneous touch input to an icon and the UI.

23. The method of claim 20, further comprising:
displaying video content on the screen;
storing a video frame image of the video content corresponding to a timestamp in response to receiving a command for bookmarking the video content; and
displaying the video frame image within the UI.

24. The method of claim 23, wherein the command for bookmarking comprises a touch and drag input to the displayed video content dragging at least a portion of the displayed video content into the UI.

25. The method of claim 23, wherein the command for bookmarking comprises a simultaneous touch input to the displayed video content and the UI.

* * * * *